(12) United States Patent
Ogasawara

(10) Patent No.: US 8,259,180 B2
(45) Date of Patent: Sep. 4, 2012

(54) METHOD AND APPARATUS FOR ESTIMATING THE IMAGING CAPABILITY OF AN IMAGE-FORMATION OPTICAL SYSTEM

(75) Inventor: Shuichiro Ogasawara, Hachioji (JP)

(73) Assignee: Olympus Corporation, Tokyo (JP)

( * ) Notice: Subject to any disclaimer, the term of this patent is extended or adjusted under 35 U.S.C. 154(b) by 1458 days.

(21) Appl. No.: 11/042,168

(22) Filed: Jan. 26, 2005

(65) Prior Publication Data

US 2005/0167499 A1 Aug. 4, 2005

(30) Foreign Application Priority Data

Jan. 26, 2004 (JP) ................................ 2004-016750

(51) Int. Cl.
*H04N 17/00* (2006.01)
(52) U.S. Cl. ........................................ 348/188; 348/335
(58) Field of Classification Search .................. 348/180, 348/187, 188, 254, 177, 178, 181, 189, 190, 348/335–369; 356/124, 124.5, 125, 394, 356/395, 243.7, 600; 382/108, 169, 191, 382/194, 199, 255, 257, 264
See application file for complete search history.

(56) References Cited

U.S. PATENT DOCUMENTS

| | | | | |
|---|---|---|---|---|
| 3,912,396 A * | 10/1975 | Hartmann | ................... | 356/124.5 |
| 5,003,166 A * | 3/1991 | Girod | ........................ | 250/201.4 |
| 5,402,224 A * | 3/1995 | Hirukawa et al. | ............. | 356/124 |
| 5,453,840 A * | 9/1995 | Parker et al. | ................... | 356/400 |
| 5,661,816 A * | 8/1997 | Fantone et al. | ............... | 382/100 |
| 5,748,230 A * | 5/1998 | Orlando et al. | ............... | 348/187 |
| 5,754,676 A * | 5/1998 | Komiya et al. | ............... | 382/132 |
| 5,760,829 A * | 6/1998 | Sussmeier | ..................... | 348/187 |
| 5,884,296 A * | 3/1999 | Nakamura et al. | .............. | 706/20 |
| 6,195,159 B1 * | 2/2001 | MacDonald et al. | ......... | 356/123 |
| 6,760,096 B2 * | 7/2004 | Kitabayashi et al. | ......... | 356/124 |
| 7,193,196 B2 * | 3/2007 | Ouellette | ................... | 250/201.8 |
| 7,598,996 B2 * | 10/2009 | Wenstrand et al. | ........... | 348/353 |
| 2003/0067595 A1 * | 4/2003 | Alderson et al. | ........... | 356/124.5 |
| 2006/0001861 A1 * | 1/2006 | Wegmann | ..................... | 356/124 |

FOREIGN PATENT DOCUMENTS

JP 2001-324413 11/2001

OTHER PUBLICATIONS

A. D. Ducharme: Using Random Test Patterns to Evaluate MTF, Mar. 12, 2002, pp. 1-8.

* cited by examiner

*Primary Examiner* — Aung S Moe
*Assistant Examiner* — Chriss Yoder, III
(74) *Attorney, Agent, or Firm* — Kenyon & Kenyon LLP

(57) ABSTRACT

The invention is concerned with an imaging capability estimation method and apparatus for an image-formation optical system, which can match the results of direct estimation of an actually visible image to the visibility of that image and is less vulnerable to image processing. According to the method and apparatus, an image of a random pattern 1 is formed through an image-formation optical system S to be inspected. A texture attribute is calculated from the picked-up random pattern image, and the obtained texture attribute is used to make an estimation of the imaging capability of the image-formation optical system S.

21 Claims, 16 Drawing Sheets

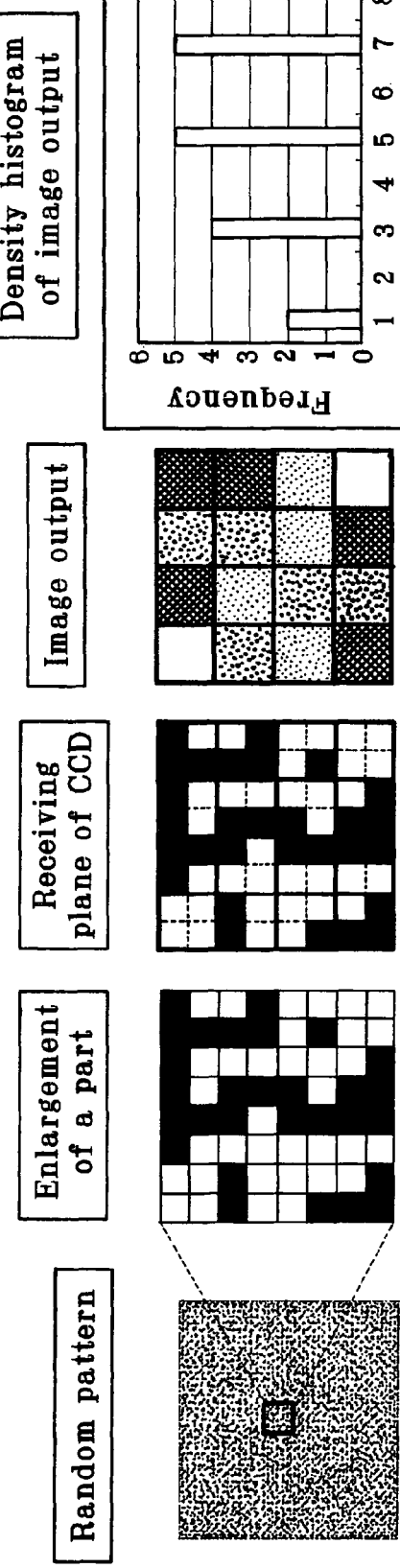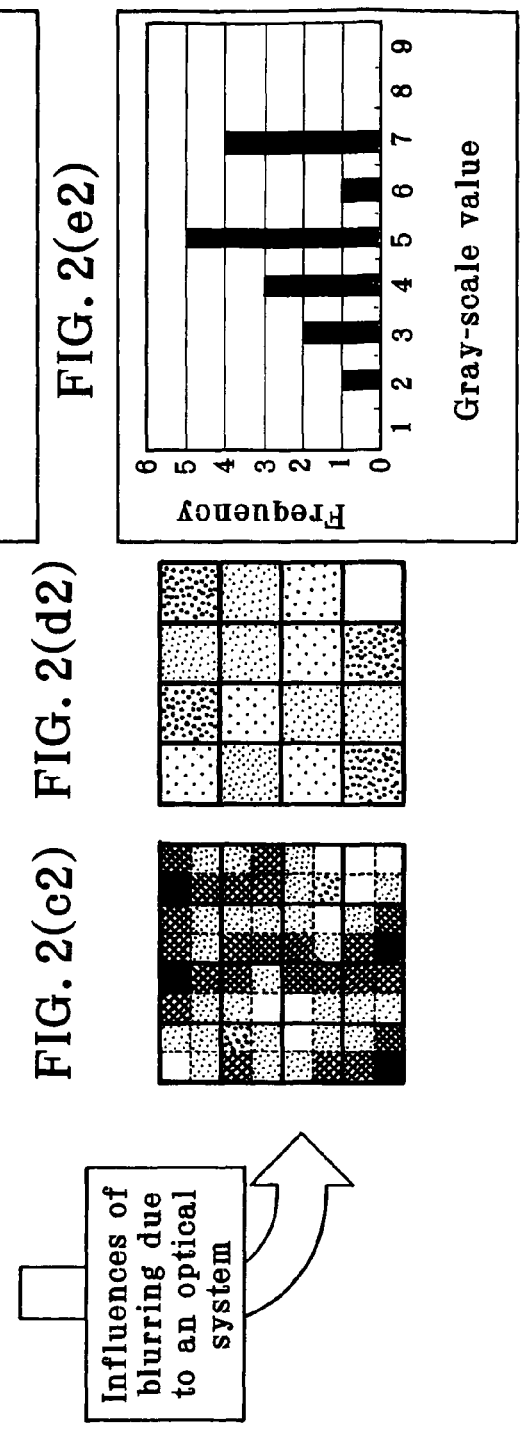

METHOD AND APPARATUS FOR ESTIMATING THE IMAGING CAPABILITY OF AN IMAGE-FORMATION OPTICAL SYSTEM

This application claims priority to Japanese Patent Application No. 2004-016750 filed on 26 Jan. 2004, the contents of which are incorporated herein by reference.

BACKGROUND OF THE INVENTION

The present invention relates generally to an imaging capability estimation method and apparatus for an image-formation optical system, and more particularly a method and apparatus for the estimation of the imaging capability of an image-formation optical system using a random pattern and texture analysis, yet without recourse to MTFs or test charts.

So far, MTF determination methods (e.g., patent publication 1) and methods that involves measuring resolutions from image-formation patterns on test charts (e.g., patent publication 2) have been known for the estimation of imaging capabilities of image-formation optical systems such as lens systems.

According to the method of patent publication 1, luminance distributions of edge-line images are used as estimation information to determine MTFs therefrom, and according to the method of patent publication 2, limiting resolutions of images on wedge charts are determined.

Apart from such methods, there is an MTF measurement method using a random pattern, as proposed by Sine Pattern Co., Ltd. According to this method, an image of such a two-dimensional random pattern as shown in FIG. 16(a) is formed through the image-formation optical system to be estimated to obtain such an image-formation pattern as shown in FIG. 16(b). Then, that image-formation pattern is broken down into rows and columns to obtain such row or column patterns as shown in FIGS. 16(c1) to 16(c4). An MTF is measured for each row and column, and the obtained value is squared to calculate a power spectrum density. Finally, the average value of the power spectrum density for each row and column is obtained by calculation, and the square root of that average value is taken to find MTFs in the row and column directions.

Patent Publication 1
JP(A)2001-324414
Patent Publication 2
JP(A)2003-9190
Non-Patent Publication 1
"Handbook for Image Analysis" compiled by the supervision of M. Takagi and one other, first edition, pp. 517-523, published on Jan. 17, 1991 from the University of Tokyo Publisher (Foundation)
Non-Patent Publication 2
"Cyclopedia for Mathematical Information Science" by M. Oya and four others, pp. 624-627, published on Nov. 10, 1995 from Asakura Shoten Co., Ltd.

In conventional MTF measurement methods, however, ever higher-precision measurements are imperative for correlations between visibility and MTFs, because there is no definite relation of MTFs to the visibility of an image formed through the image-formation optical system to be estimated and, hence, what difference is between them is uncertain. A drawback of how to find MTFs using a digital imaging system is that it is sensitive to image processing. Methods of finding limiting resolutions give only limiting resolutions, and render correlations with visibility vague. Another problem with the use of the digital imaging system is large errors due to position dependencies of images and pixels.

SUMMARY OF THE INVENTION

In view of such problems with the prior art as described above, the present invention has for its object the provision of an imaging capability estimation method and apparatus for an image-formation optical system, which enable a random image-formation pattern to be analyzed for texture without recourse to any conventional MTF or test chart thereby making a direct estimation of an actually visible image for matching the results of estimation to the visibility of the image, and which are less sensitive to image processing.

In order to accomplish the above object, the present invention provides an imaging capability estimation method for an image-formation optical system, characterized in that:

a random pattern image is picked up through said image-formation optical system, a texture attribute is calculated from the thus picked-up random pattern image, and said image-formation optical system is estimated for imaging capability, using the obtained texture attribute.

The present invention also provides an imaging capability estimation method for an image-formation optical system, characterized by involving steps of:

picking up a random pattern image through said image-formation optical system, calculating a texture attribute from the picked-up random pattern image, and adjusting a position, and making a pass/fail judgment, of said image-formation optical system, using the calculated texture attribute.

Preferably, the inventive method further comprises a step of forming the picked-up random pattern image into a grayscale image prior to calculation of the texture attribute.

Preferably, the inventive method further comprises a step of binarizing the picked-up random pattern image prior to calculation of the texture attribute.

For the texture attribute, a texture attribute using a concurrent incidence matrix or a texture attribute using a differential statistic may be used.

In one embodiment of the invention, while changing a position of a random pattern located with respect to said image-formation optical system or a position of an image pickup device located with respect to said image-formation optical system, the random pattern image is sequentially picked up, the texture attribute is calculated from the picked-up random pattern image, and how the obtained texture attribute changes with respect to the position of the random pattern located or the position of the image pickup device located is found to determine a range of the position of the random pattern located or the image pickup device located, in which the texture attribute exceeds a preset threshold value.

It is then required that a random pattern be changed with a change in the position of the random pattern located with respect to the image-formation optical system.

In another embodiment of the invention the field depth of said image-formation optical system with respect to a particular image plane position may be determined.

In yet another embodiment, a common image plane position range, in which an image is formable with respect to both a far point and a near point of an object position of said image-formation optical system, may be determined, or the imaging capability of said image-formation optical system at both a central area and a peripheral area of an image plane thereof may be determined for estimation of local blurring.

Further, the present invention provides an imaging capability estimation apparatus for an image-formation optical system, characterized by comprising:

a chart mount for supporting a random pattern, an image-formation optical system supporter for supporting said image-formation optical system, which is located for relative movement in an orthogonal direction with respect to said chart mount, and an image pickup device holder for supporting an image pickup device on an image plane side of said image-formation optical system supported on said image-formation optical system supporter for adjustment in an optical axis direction thereof, and further comprising a texture attribute calculation means for calculation of a texture attribute from an image of said random pattern picked up by said image pickup device.

Preferably in this case, said chart mount is designed in such a way as to interchangeably support thereon a plurality of random patterns.

It is also preferable that said chart mount is designed in such a way as to be adjustable for position in two directions orthogonal with respect to the optical axis of said image-formation optical system.

The invention apparatus should preferably comprise means for forming the image of the random pattern picked up by said image pickup device into a gray-scale image.

The inventive apparatus may further comprise means for binarizing the image of the random pattern picked up by said image pickup device into a gray-scale image.

Furthermore, the present invention provides a focusing apparatus for an image-formation optical system, characterized by comprising:

a chart mount for supporting a random pattern, an image-formation optical system supporter for supporting said image-formation optical system, which is located for relative movement in an orthogonal direction with respect to said chart mount, and an image pickup device holder for supporting an image pickup device on an image plane side of said image-formation optical system supported on said image-formation optical system supporter for adjustment in an optical axis direction thereof, and further comprising a texture attribute calculation means for calculation of a texture attribute from an image of said random pattern picked up by said image pickup device.

According to the invention, the random pattern image is picked up through the image-formation optical system to be inspected, a texture attribute is calculated from the picked-up random pattern image, and the obtained texture attribute is used for the estimation of the imaging capability of the image-formation optical system. This is substantially tantamount to the direct estimation of an actually visible image, and enables the results of estimation to match directly to the visibility of the image while the results of estimation are less vulnerable to image processing.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 2 is illustrative in conception of what happens when the random pattern is used as a subject to pick up its image.

DESCRIPTION OF THE PREFERRED EMBODIMENTS

In the invention, when the imaging capability of an image-formation optical system is estimated, a random pattern is used as the pattern used for image formation. The "random pattern" used herein is understood to refer to a binary pattern wherein, as shown typically in FIG. 1, white and black square dots are arranged randomly in row and column directions at a number (area) base ratio of 1:1. Even in a given small region randomly extracted from such a random pattern, the number (area) base of the white to black dots is still 1:1. Such a random pattern, for instance, may be fabricated such that, given that 1 and 0 match a white dot and a black dot, respectively, and all rows or columns are sequentially connected into a sequence of numbers, 1's and 0's are unsystematically or randomly arranged in that sequence. Although a much stricter definition of the random pattern used herein will be given later, it is here to be noted that the chart is not necessarily made of square dots.

The features of that random pattern are that (1) it is a subject pattern in an almost real state where an image-formation optical system is actually used, having frequency characteristics similar to those of natural sceneries (such as clouds and water surfaces), lacking regularities (structures and directivities) and having a broader range of frequency characteristics, (2) it is little vulnerable to sampling by an image pickup device, and (3) those features are quantified as statistics (general tendencies).

Figure 1:
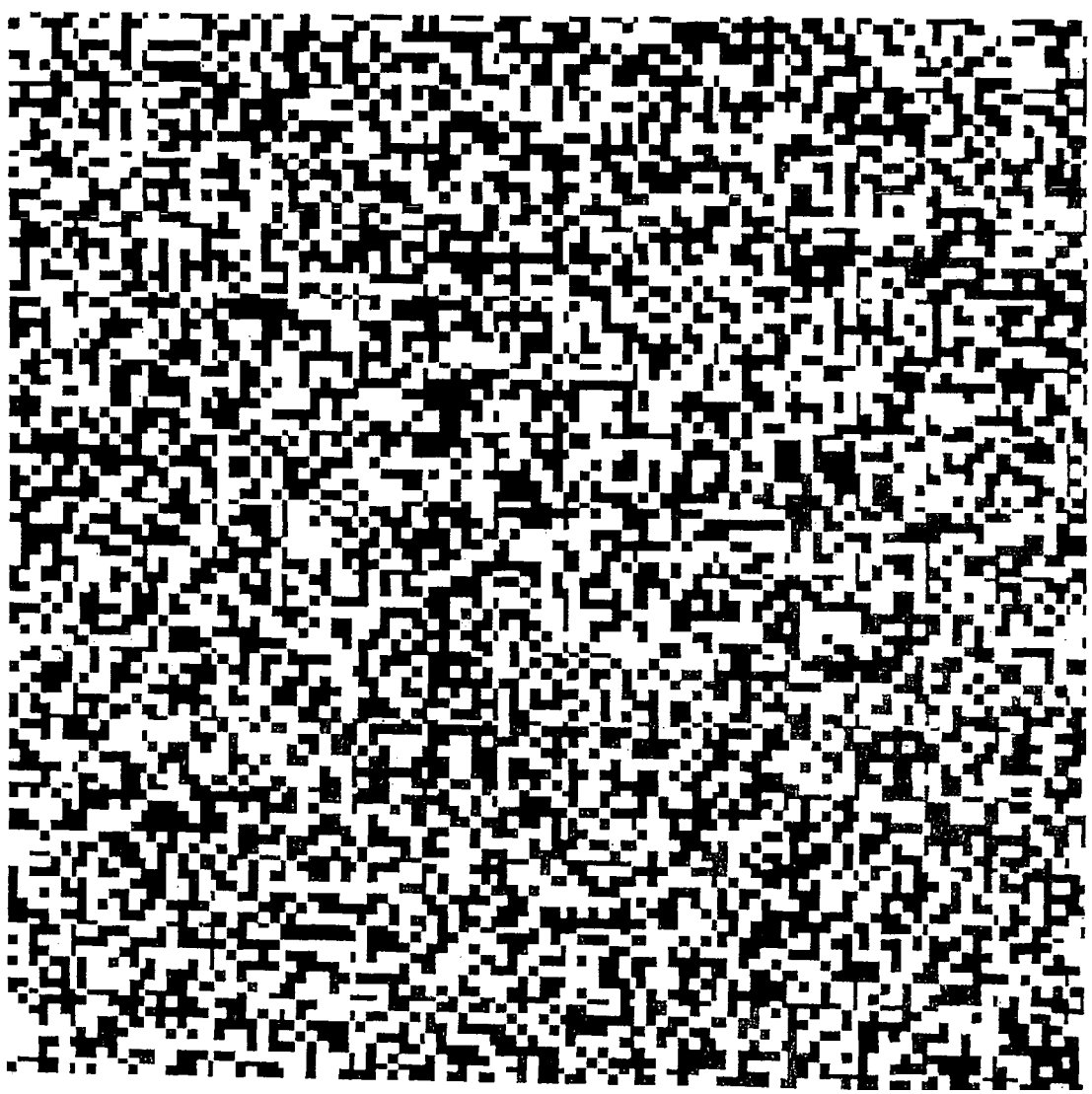
FIG. 1 is illustrative of one example of the random pattern used with the imaging capability estimation method and apparatus for an image-formation optical system according to the invention.
Figure 3:
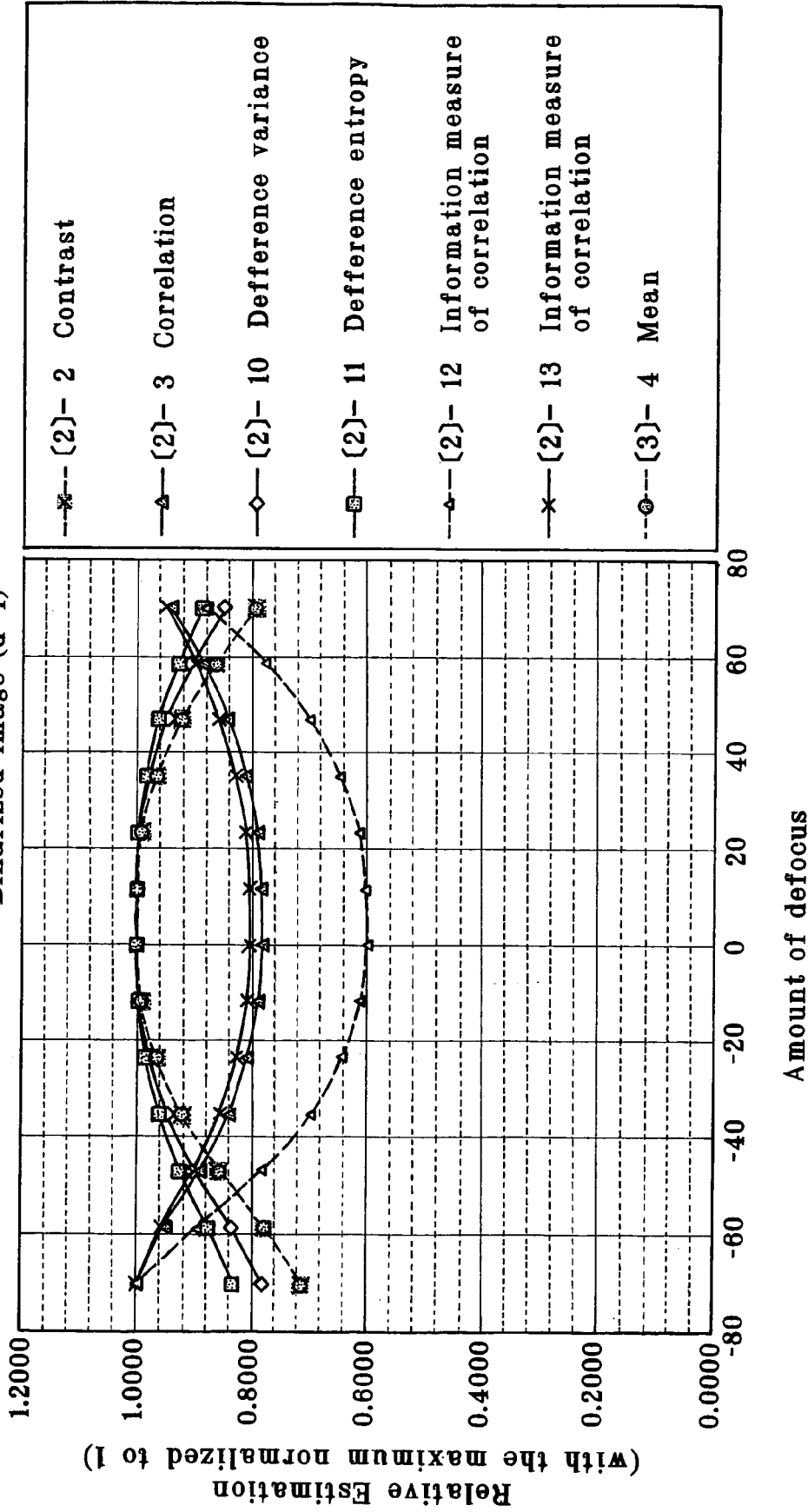
FIG. 3 is illustrative of how a part of texture attributes usable herein behaves with respect to the amount of defocus.
Figure 4:
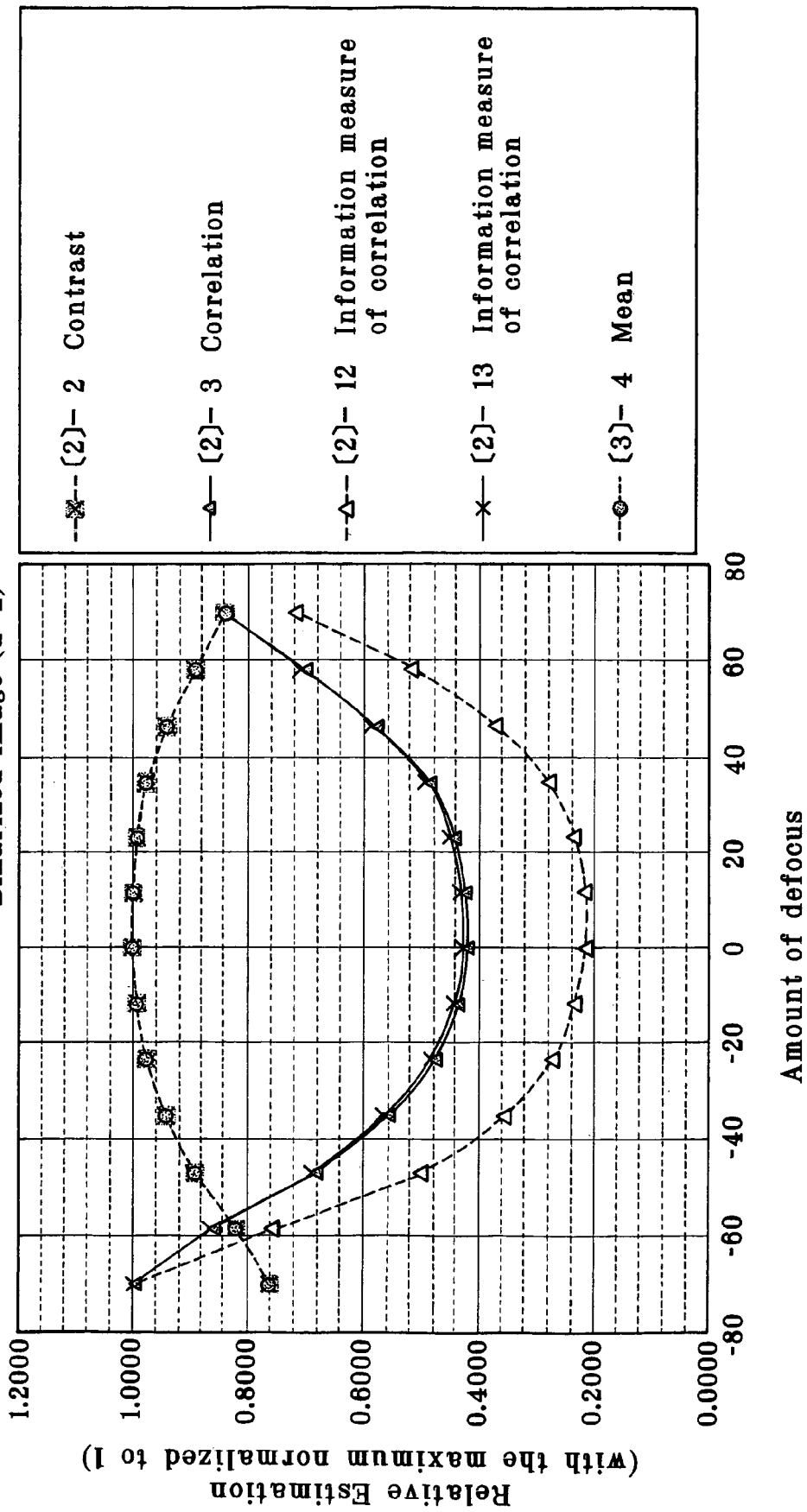
FIG. 4 is illustrative of how another part of texture attributes usable herein behaves with respect to the amount of defocus.
Figure 5:
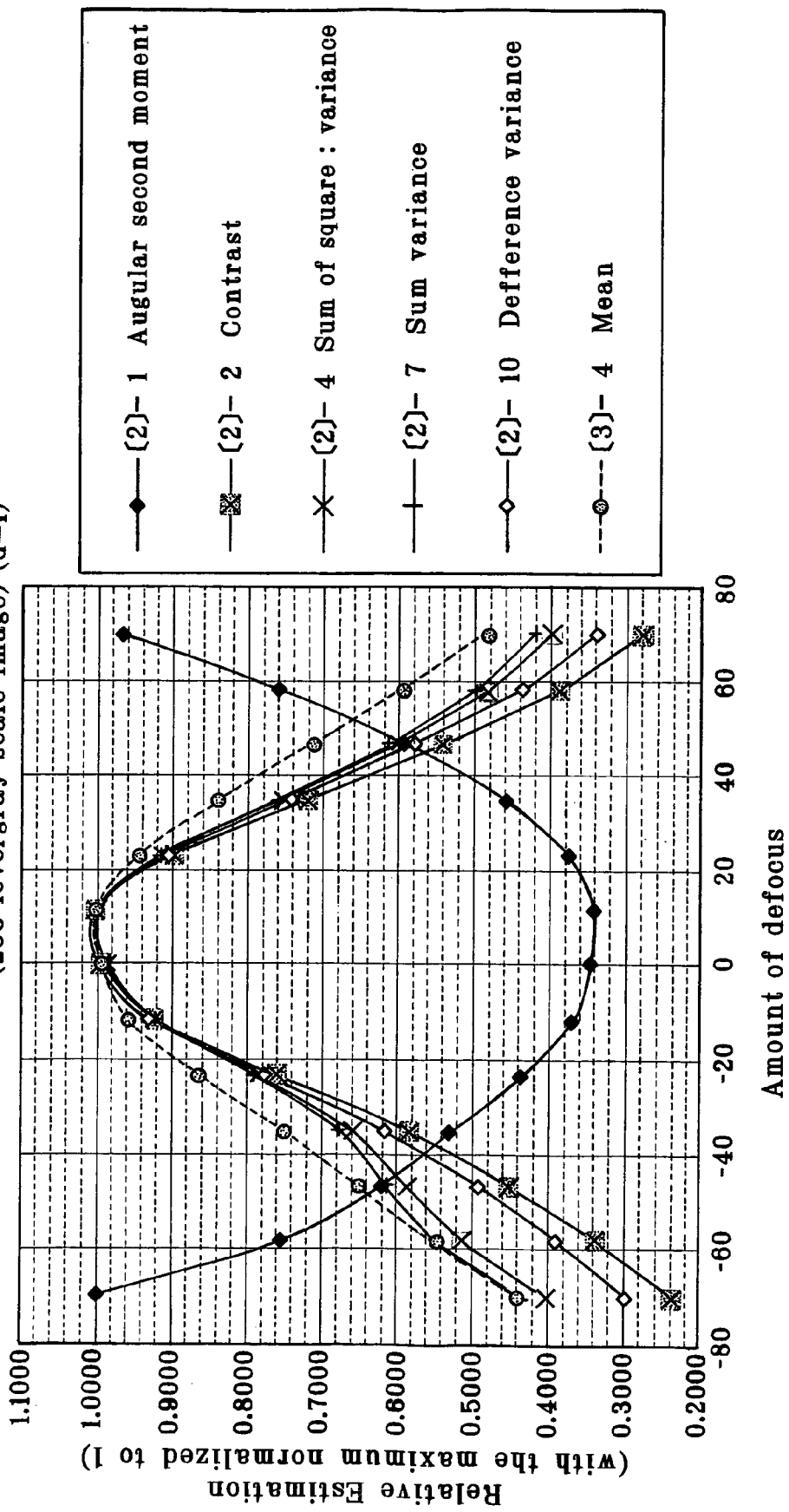
FIG. 5 is illustrative of how yet another part of texture attributes usable herein behaves with respect to the amount of defocus.
Figure 6:
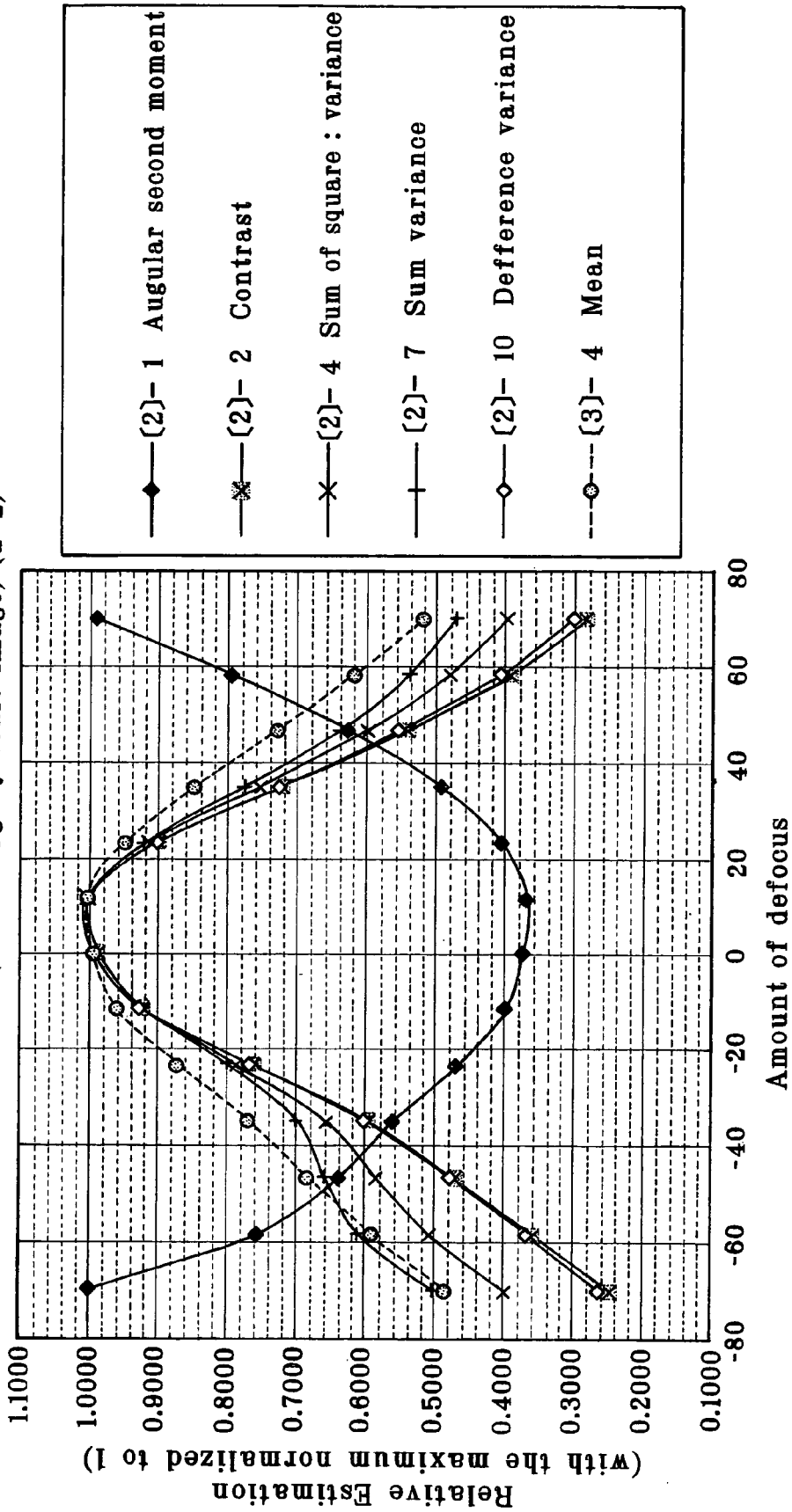
FIG. 6 is illustrative of how a further part of texture attributes usable herein behaves with respect to the amount of defocus.

FIGS. 2(a) to 2(e2) are illustrative in conception of how such a random pattern is picked up as a subject image. FIG. 2(a) shows such a random pattern as shown in FIG. 1, a part of which is enlarged in FIG. 2(b). For instance, when a CCD is used as the image pickup device, an image of that random pattern is picked up on the receiving plane of CCD, as shown in FIG. 2(c1) or 2(c2). However, pixels on the receiving plane of CCD are areas delimited by thick contour lines. In this embodiment, each pixel area is assumed to match with a 2×2 dot image area on the random pattern. Specifically, FIG. 2(c1) shows an image completely free of blurs formed on the receiving plane of CCD through an ideal image-formation optical system, and FIG. 2(c2) shows a blurred image formed through an image-formation optical system that has aberrations or an image-formation optical system that is out of focus. Image signals picked up by CCD in two such states are produced as such image outputs as shown in FIGS. 2(d1) and 2(d2), respectively, with such density histograms as shown in FIGS. 2(d1) and 2(d2), respectively. In FIG. 2(c1), an inter-pixel output difference becomes relatively large, because the 2×2 dots on the random pattern are averaged in precise matching with one pixel of CCD, and are unlikely to run through adjoining pixels. In the histogram of FIG. 2(e1), gray-scale values are distributed over a relatively wide range; when there is an image formed with blurs as depicted in FIG. 2(c2), however, the inter-pixel output difference becomes relatively small because the 2×2 dots in the random pattern are in precise matching with one CCD pixel and run partly through adjoining pixels. In the density histogram of FIG. 2(e2), on the other hand, gray-scale values are intensively distributed in the vicinity of a central average.

In the invention, an image obtained by picking up an image of such a random pattern as depicted in FIG. 2(d1) or 2(d2) is analyzed for texture to make an estimation of the image-formation optical system through the results of analysis.

Texture analysis is now explained. Texture analysis is tantamount to extraction of texture attributes mentioned in non-patent publication 1, and the "texture" is understood to refer to a state having a uniform fine texture pattern distribution. How to calculate statistical texture attributes involves primary statistics, secondary statistics, and higher-order statistics. In the invention, however, the image obtained by picking up the image of such a random pattern as depicted in FIG. 2(d1) or 2(d2) is analyzed for texture by means of a concurrent incidence matrix included mainly in the secondary statistics. It is here to be noted that differential statistics having correlations with a concurrent incidence matrix could also be used.

The invention is now explained specifically with reference to an image-formation optical system having such lens data as described below. How attributes (1) to (14) in the concurrent incidence matrix in non-patent publication (1) and attributes (1) to (4) in the differential statistics in non-patent publication (1) behaved was measured at a fixed object distance of 12.2 mm and positions where an image pickup plane was axially shifted from the center best focus position by ±11.7 μm, ±23.4 μm, ±35.1 μm, ±46.8 μm, ±58.5 μm and ±70.2 μm. In this regard, while the attributes are indicated by encircled numbers in non-patent publication 1, the attributes here are indicated by bracketed numbers. It has consequently been found that the attributes (1) to (4), (7), (10), (12) and (13) in the concurrent incidence matrix and the attribute (4) in the differential statistics in non-patent publication (1) are helpful for the estimation of the imaging capability of the image-formation optical system from the image obtained by picking up a random pattern image. Illustrative of how those viable attributes behave with respect to the amount of defocus (shift), FIGS. 3-6 evidently teach that any of the above attributes changes significantly depending on the amount of defocus or blurs, and reaches a maximum at the best focus position. As can be seen, the attributes (1), (3), (12) and (13) in the concurrent incidence matrix reach a minimum at the best focus position, with the amount of defocus increasing toward both sides, and the attributes (2), (4), (7) and (10) in the concurrent incidence matrix and the attribute (4) in the differential statistics reaches a maximum at the best focus position, with the amount of defocus decreasing toward both sides.

In Table 1, ⊚, ○ and Δ indicate that the attributes are best suited, second best and usable for estimation, respectively. In Table 1 and FIGS. 3-6, the "binarized image" refers to a picked-up random pattern image in which pixel values are binarized into 0 and 1 on the basis of the average μ of its density histogram, the "256-level gray-scale image" refers to an image in which 256-level gray-scale digital image signals are imaged immediately according to its pixel values, and d is a value that corresponds to r in non-patent publication 1.

TABLE 1

Pursuant to what is diclosed in non-patent publication 1

| | | | Binarized image | | | 256-level gray-scale image | | | Comprehensive |
|---|---|---|---|---|---|---|---|---|---|
| | | Note | d = 1 | d = 2 | General judgment | d = 1 | d = 2 | General judgment | judgment |
| [2] Concurrent incidence matrix | | | | | | | | | |
| [2]-(1) | augular second moment | | | | | Δ | Δ | Δ | Δ |
| [2]-(2) | contrast | | ○ | Δ | Δ | ○ | ○ | ○ | ⊚ |
| [2]-(3) | correlation | | Δ | ○ | ○ | | | | ○ |
| [2]-(4) | sum of square: variance | | | | | ○ | ○ | ○ | ○ |
| [2]-(5) | inverse difference moment | | | | | | | | |
| [2]-(6) | sum average | | | | | | | | |
| [2]-(7) | sum variance | | | | | ○ | ○ | ○ | ○ |
| [2]-(8) | sum entropy | | | | | | | | |
| [2]-(9) | entropy | | | | | | | | |
| [2]-(10) | defference variance | | Δ | | | ○ | ○ | ○ | ○ |
| [2]-(11) | difference | | Δ | | | | | | |

TABLE 1-continued

Pursuant to what is diclosed in non-patent publication 1

| | | | Binarized image | | | 256-level gray-scale image | | Comprehensive |
| | | Note | d = 1 | d = 2 | General judgment | d = 1 | d = 2 | General judgment | judgment |
|---|---|---|---|---|---|---|---|---|---|
| [2]-⑫ | information measure of correlation | | ○ | ○ | ○ | | | | ○ |
| [2]-⑬ | information measure of correlation | | Δ | ○ | ○ | | | | ○ |
| [2]-⑭ | maximal correlation coefficient | | | | | | | | |
| [3] Differential statistics | | | | | | | | | |
| [3]-① | contrast | Same as[2]-② | | | | | | | |
| [3]-② | angular second moment | | | | | | | | |
| [3]-③ | entropy | Same as[2]-⑪ | | | | | | | |
| [3]-④ | mean | | ○ | Δ | Δ | Δ | Δ | Δ | ○ |

Data on the lenses in the image-formation optical system used for the estimation of attributes

| | | | |
|---|---|---|---|
| $r_1 = \infty$ | $d_1 = 0.42$ | $n_{d1} = 1.883$ | $v_{d1} = 40.78$ |
| $r_2 = 0.7178$ | $d_2 = 0.42$ | | |
| $r_3 = \infty$ | $d_3 = 0.4582$ | | |
| $r_4 = 6.6211$ | $d_4 = 1.4053$ | $n_{d2} = 1.713$ | $v_{d2} = 53.84$ |
| $r_5 = -1.4896$ | $d_5 = 0.082$ | | |
| $r_6 = \infty^*$ | $d_6 = 0.45$ | $n_{d3} = 1.52287$ | $v_{d3} = 59.89$ |
| $r_7 = \infty$ | $d_7 = 0.0472$ | | |
| $r_8 = \infty$ | $d_8 = 0.752$ | $n_{d4} = 1.514$ | $v_{d4} = 75$ |
| $r_9 = \infty$ | $d_9 = 0.1$ | | |
| $r_{10} = 2.8562$ | $d_{10} = 0.972$ | $n_{d5} = 1.6968$ | $v_{d5} = 55.53$ |
| $r_{11} = -1.2378$ | $d_{11} = 0.3045$ | $n_{d6} = 1.84666$ | $v_{d6} = 23.78$ |
| $r_{12} = -6.4782$ | $d_{12} = 0.1$ | | |
| $r_{13} = \infty$ | $d_{13} = 0.45$ | $n_{d7} = 1.52287$ | $v_{d7} = 59.89$ |
| $r_{14} = \infty$ | $d_{14} = 0.5$ | | |
| $r_{15} = \infty$ | $d_{15} = 0.58$ | $n_{d8} = 1.51633$ | $v_{d8} = 64.15$ |
| $r_{16} = \infty$ | $d_{16} = 0.88$ | $n_{d9} = 1.53172$ | $v_{d9} = 48.91$ |
| $r_{17} = \infty$ | | | |

$\infty^*$: stop surface
Object distance = 12.2 mm
Focal length = 1 mm
F-number = 3.599

It is here noted that $r_1, r_2, \ldots$ are the radii of curvature of the lens surfaces as counted from the object side of the image-formation optical system, $d_1, d_2, \ldots$ are the spacing between adjacent lens surfaces, $n_{d1}, n_{d2}, \ldots$ are the d-line refractive indices of the lenses, and $v_{d1}, v_{d2}, \ldots$ are the Abbe numbers of the lenses.

From Table 1 and the results of FIGS. 3-6, it is found that for the extraction of the texture attributes of the random pattern image blurred by defocus or aberrations, there are a particular set of attributes that should preferably be extracted after binarization of that image, and another particular set of attributes that should preferably be extracted after digital image signals are imaged immediately as pixel values.

The random pattern used herein is now defined. The random pattern used according to the invention should satisfy conditions 1-3 as well as conditions 4(A), 4(B) and 4(C).
1. An estimation range is set in such a way as to ensure at least 100 cells, preferably, at least about 2,500 (=50×50) cells.
2. The estimation range is divided into lattice areas in such a way as to satisfy the following condition:

$l \leq 4 \times p/|\beta|$, more preferably $l \leq 2 \times p/|\beta|$, or $l \leq 4 \times P/|\beta|$, more preferably $l \leq 2 \times P/|\beta|$ where l is the length of one side of each lattice as defined in the X-, and Y-axis directions, respectively,
p is a sampling interval, for instance, a pixel pitch in the case of a CCD,
$\beta$ is the magnification of the optical system at an object distance used, and
P is a value, calculated as size on the image plane, of a pixel pitch or a minimum information unit (pulse) on estimation image signals, which is actually larger in display size, or
a value, calculated as size on the image plane, of a pixel pitch or a minimum display unit (dot) on estimation display image, which is actually larger in display size.
3. The gray-scale value of each lattice cell is normalized with a theoretical maximum value of 1. Here the "gray-scale value" refers to the quantity of light transmitted through or reflected at each cell.
4. The obtained gray-scale value histogram satisfies the following conditions:
(A) average $\mu \leq 0.5 \pm 0.3$, more preferably $\mu \leq 0.5 \pm 0.2$, even more preferably $\mu \leq 0.5 \pm 0.1$
(B) kurtosis $|K| \leq 1.2$, more preferably $|K\uparrow| \leq 0.7$, even more preferably $|K| \leq 0.3$
(C) skewness $|S| \leq 0.9$, more preferably $|S| \leq 0.3$, even more preferably $|S| \leq 0.1$ For the kurtosis and skewness, see non-patent publication 1, p. 518.

Conditions (A), (B) and (C) are provided for judging whether or not a sample is usable in the invention depending on whether or not a sampled data histogram is approximate to a normal distribution, using the feature of a randomly extracted sample that the distribution of its averages converges on a normal distribution according to the central limit theorem (non-patent publication 2).

Specific arrangements of how to make an estimation of the performance of the image-formation optical system to be inspected from the results of texture analysis of a random pattern image obtained by using such a random pattern as defined above as a subject to pick up its image through that image-formation optical system according to the invention are now explained.

Figure 7:
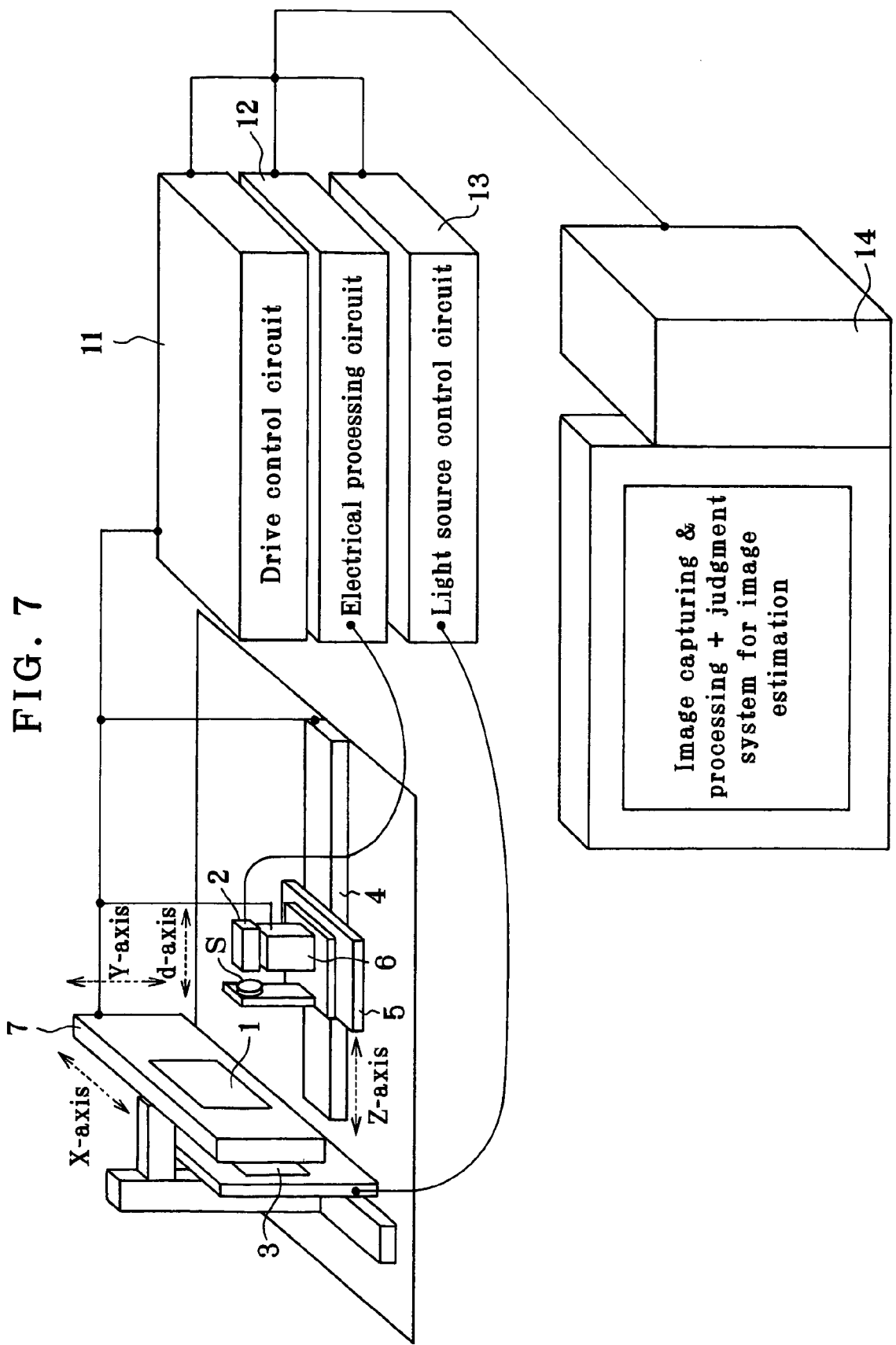
FIG. 7 is illustrative in schematic of the general arrangement of one embodiment of the imaging capability estimation apparatus according to the invention.

FIG. 7 is illustrative in schematic of a general arrangement of one embodiment of the imaging capability estimation apparatus according to the invention. A random pattern 1 is mounted on a chart mount 7, and illuminated by a surface light source 3 from its back surface. An image-formation optical system S to be inspected is fixed on a moving table 5 that is movably placed on a rail 4 extending in an orthogonal direction with respect to the random pattern 1. On the image side of the image-formation optical system S on the moving table 5, there is located an image pickup device holder 6 for adjustably holding an image pickup device, specifically a CCD 2 in the optical axis direction of the image-formation optical system S. It is noted that instead of the moving table 5, the chart mount 7 could be movably placed on the rail 4.

The random pattern 1 on the chart mount 7 is mounted in such a way that its position is adjustable by driving signals from a drive control circuit 11 in the X- and Y-axis directions vertical to the optical axis (Z-axis) direction of the image-formation optical system S. Again in response to driving signals from the drive control circuit 11, the movement of the moving table 5 on the rail 4 is adjusted so as to adjust the position of the image-formation optical system S fixed thereon in the optical axis direction. The image pickup device holder 6 is also located in such a way that similarly in response to driving signals from the drive control circuit 11, CCD 2 supported thereon is adjustably movable in the optical axis direction of the image-formation optical system S. It is here noted that adjustment of the position of the random pattern 1 with respect to the optical axis of the image-formation optical system S is indicated as X-axis adjustment and Y-axis adjustment by double-action arrows, adjustment of an object distance in the optical axis direction of the image-formation optical system S as Z-axis adjustment by a double action arrow, and adjustment of a image plane position for CCD 2 in the optical axis direction of the image-formation optical system as d-axis adjustment by a double action arrow. Light emission from the surface light source 3 is controlled by a light source control circuit 13.

Imaging signals of the random pattern 1 picked up at CCD 2 upon subjected to the given X-, Y-, Z- and d-axis adjustments are entered into an electrical processing circuit 12 for image processing such as γ correction and white balance adjustment. Then, the thus processed signals are entered in the form of, for instance, 256-level gray-scale image signals in a personal computer 14 for processing such as gray-scale image conversion and processing such as texture analysis.

One basic mode of how to make an estimation of imaging capability using the apparatus of FIG. 7 according to the invention is now explained with reference to the flow charts of FIGS. 8 and 9.

Figure 8:
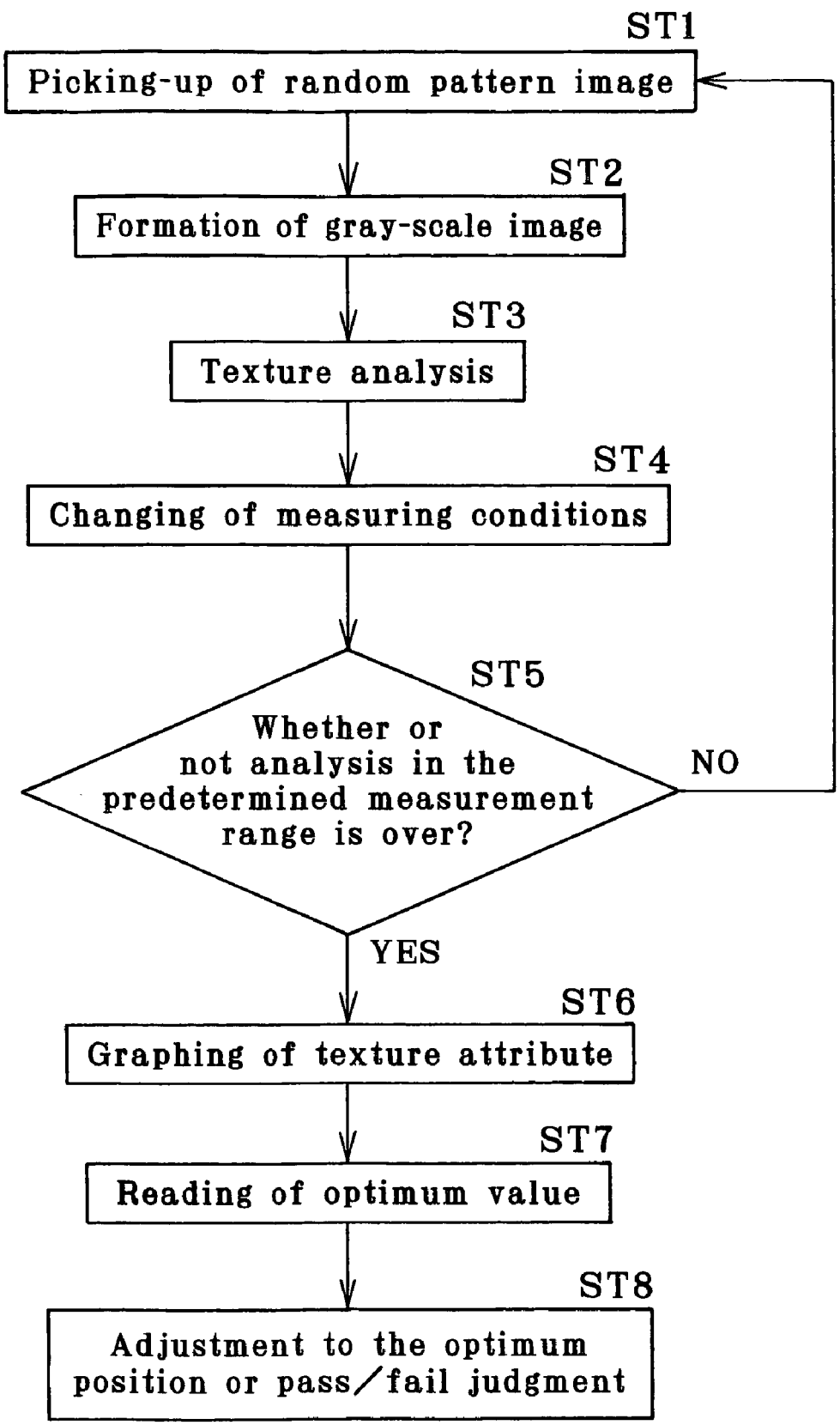
FIG. 8 is a flowchart of one basic form of the inventive imaging capability estimation method that does not rely on binarization.
Figure 9:
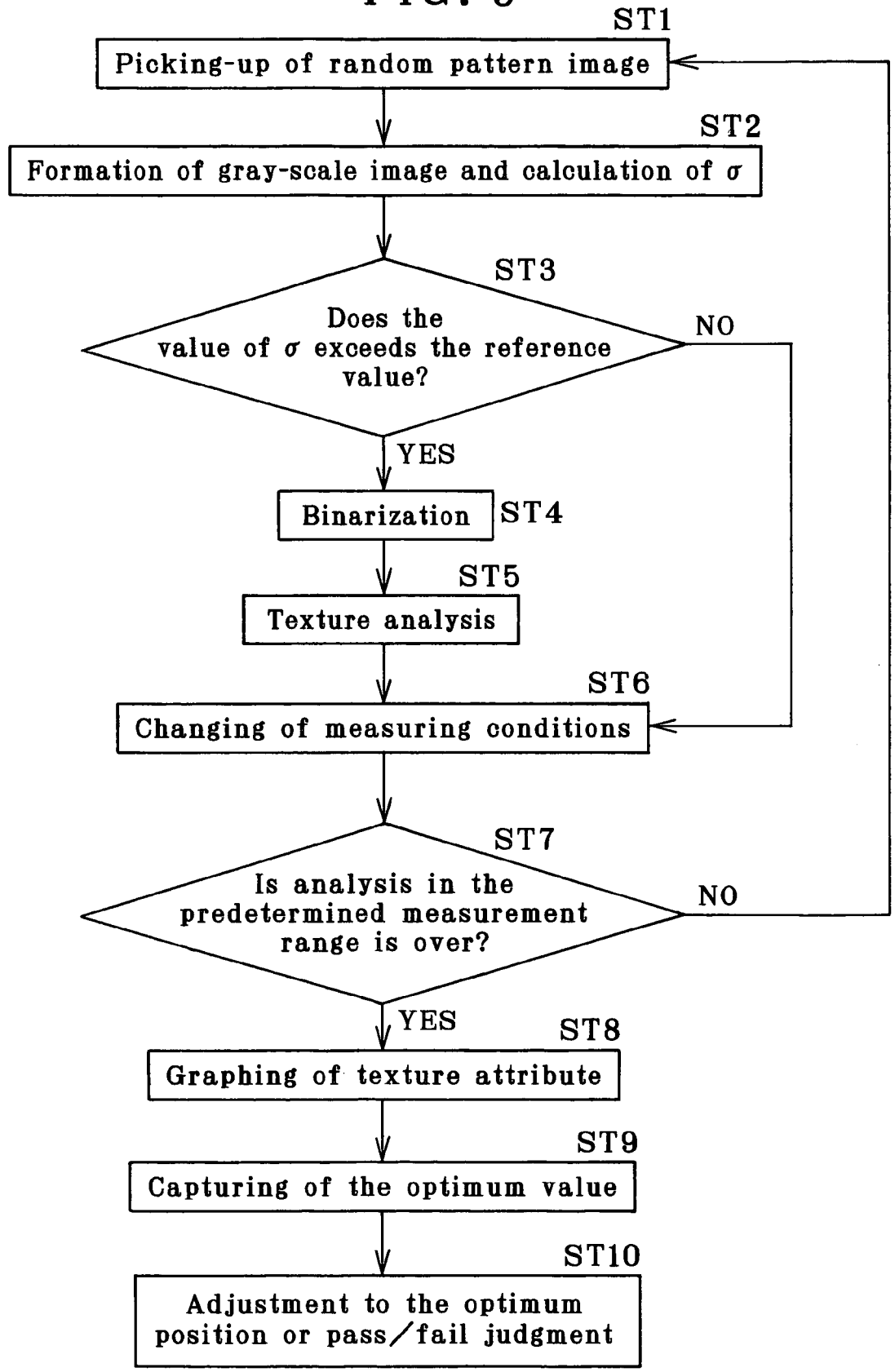
FIG. 9 is a flowchart of one basic form of the inventive imaging capability estimation method that relies on binarization.

A difference between FIGS. 8 and 9 is whether an image—obtained by picking-up processing at CCD 2 of the image of the random pattern 1 formed through the image-formation optical system S to be inspected—is binarized (FIG. 9) or not (FIG. 8). In other words, it is preferable to follow the flow chart of FIG. 8 that does not involve binarization, except some cases where illumination for the random pattern 1 lacks uniformity and stability or there are large variations in the magnification (focal length) of the image-formation optical system S to be inspected.

Referring first to FIG. 8, an image of the random pattern 1 is formed at step ST1 through the image-formation optical system S. The thus obtained image signals are digital color image signals of 256-level gray scale, to which image processing is applied, if required, for noise removal or the like.

Here, if the random pattern 1 comprises a 2-level gray-scale transmission type chart, it is illuminated from its back surface by incoherent uniform illumination light coming from the surface light source 3. When the random pattern 1 comprises a reflection dispersion type chart, it is illuminated from the front by the same illumination light. In this case, selection is made from a plurality of random patterns depending on the estimation conditions in such a way as to satisfy the above definitions. It is to be noted that for the random pattern 1, it is acceptable to form and show pattern information on PDPs or liquid crystal displays by means of a surface-emitting display system.

Then, the obtained image is formed at step ST2 into a gray-scale image. To this end, luminance signals may be formed into a gray-scale image, or RGB signals may be averaged, or G signals may be formed into a gray-scale image.

Then, at step ST3, the gray-scale image is analyzed for texture, using any of the attributes (1)-(4), (7), (10), (12) and (13) in the concurrent incidence matrix, and the attribute (4) in the differential statistics set out in Table 1, for instance, the attribute (2) (contrast) or (3) (correlation) in the concurrent incidence matrix, with 1 or 2 used as d (distance). For the value corresponding to θ in patent publication 1, there is used a texture attribute that is obtained by averaging attributes in four directions of 0°, 45°, 90° and 135° if necessary, with noise removal or the like. For instance, a plurality of measurements may be averaged or subjected to median operation.

Then, at step ST4 the measuring conditions are continuously changed depending on a particular purpose. For instance, the position of the image plane is changed to measure a focusing interval (range), the object distance is changed to measure a filed depth, and the position of estimation coordinates on the image plane is changed to estimate local blurring.

Then, at step ST5, it is determined whether or not the texture analysis in the predetermined measurement range has been over. If it has, the texture attribute is graphed at the subsequent step ST6 (see FIGS. 3-6). If it has not, one goes back to step ST1 to repeat steps ST1 to ST5 until it is over.

Then, at step ST7 optimum values (maximum, and minimum value) of the texture attribute are read out to obtain an optimum value (range) depending on a particular destination.

Finally, at step ST8 operation depending on the particular purpose, adjustment to an optimum position, pass/fail judgment etc. are performed in response to the obtained optimum value. For instance, there are focusing enough to ensure image quality, correction of local blurring, inspection of imaging capabilities such as field depth and local blurring.

It is here that while the image-formation optical system S to be inspected is fixed to a specific one, it is also possible to make an estimation of differences between individual imaging systems such as the analog circuit of the electric processing circuit 12.

The flowchart of FIG. 9 for binarization is now explained. At step ST1, an image of a random pattern 1 is picked up through an image-formation optical system S to be inspected. The thus obtained image signals are digital color image signals of 256-level gray scale, to which image processing is applied, if required, for noise removal or the like.

Here, if the random pattern 1 comprises a 2-level gray-scale transmission type chart, it is illuminated from its back surface by incoherent uniform dispersion illumination light coming from a surface light source 3. When the random pattern 1 comprises a reflection dispersion type chart, it is illuminated from the front by the same illumination light. In this case, selection is made from a plurality of random patterns depending on estimation conditions in such a way as to satisfy the above definitions. It is to be noted that for the random pattern 1, it is acceptable to form and show pattern information on PDPs or liquid crystal displays by means of a surface-emitting display system.

Then, the obtained image is formed at step ST2 into a gray-scale image. To this end, luminance signals may be formed into a gray-scale image, or RGB signals may be averaged, or G signals may be formed into a gray-scale image. Then, a standard deviation σ may be found by calculation from a density histogram of that gray-scale image.

Then, at step ST3 it is judged whether or not the obtained standard deviation σ exceeds a reference value. When the standard deviation σ is greater than the reference value, the gray-scale image is binarized at the next step ST4 into a binary image (white-and-black image of 2-level gray scale). Referring here to the binarization criterion, pixel values may be binarized into 1 and 2 on the basis of the average $\mu$ of a density histogram. Alternatively, when there is a variation in illumination, binarization may be performed by moving average (due to the local mean value of peripheral pixels). This step is less sensitive to image processing, because binarization makes any direct estimation of luminance information unnecessary. When, at step ST3, the obtained standard deviation $\sigma$ is below the reference value leading to too noticeable blurring, one should skip from this step to step ST6 where the measuring conditions are changed.

The reason of judging whether or not the obtained standard deviation $\sigma$ is below the reference value is that as an overly blurred image of the random pattern 1 is binarized, the standard deviation $\sigma$ of the density histogram becomes small and, hence, gray-scale values are intensively distributed in the vicinity of the median average $\mu$ of the density histogram, rendering extraction of the texture attribute difficult; that is, texture analysis must be performed only when the standard deviation $\sigma$ is larger than the predetermined reference value.

Then, at step ST5, the gray-scale image is analyzed for texture, using any of the attributes (1)-(4), (7), (10), (12) and (13) in the concurrent incidence matrix, and the attribute (4) in the differential statistics set out in Table 1, for instance, the attribute (2) (contrast) or (3) (correlation) in the concurrent incidence matrix, with 1 or 2 used as d (distance). For the value corresponding to θ in patent publication 1, there is used a texture attribute that is obtained by averaging attributes in four directions of 0°, 45°, 90° and 135°, if necessary, with noise removal or the like. For instance, a plurality of measurements may be averaged or subjected to median operation.

Then, at step ST6 the measuring conditions are continuously changed depending on a particular purpose. For instance, the position of the image plane is changed to measure a focusing interval (range), the object distance is changed to measure the field depth, and the position of estimation coordinates on the image plane is changed to estimate local blurring.

Then, at step ST7, it is determined whether or not the texture analysis in the predetermined measurement range has been over. If it has, the texture attribute is graphed at the subsequent step ST8 (see FIGS. 3-6). If it has not, one goes back to step ST1 to repeat steps ST1 to ST7 until it is over.

Then, at step ST9 the optimum values (maximum, and minimum value) of the texture attribute are read out to obtain an optimum value (range) depending on a particular destination.

Finally, at step ST10 operation depending on the particular purpose, adjustment to an optimum position, pass/fail judgment etc. are performed in response to the obtained optimum value. For instance, there are focusing enough to ensure image quality, correction of local blurring, inspection of imaging capabilities such as field depth and local burring.

It is here that while the image-formation optical system S to be inspected is fixed to a specific one, it is also possible to make an estimation of differences between individual imaging systems such as the analog circuit of the electric processing circuit 12.

Referring here to FIGS. 8 and 9 alike, it is understood that if the image of the random pattern 1 formed through the image-formation optical system S to be inspected is estimated using as the texture attribute two or more of those including the primary statistics found from the density histogram (non-patent publication 1) such as standard deviation $\sigma$, it is then possible to make a more precise estimation of the imaging capability.

A specific embodiment of making such an estimation of imaging capability is now explained with reference to estimation of the field depth, focusing, and estimation of local blurring.

Figure 10:
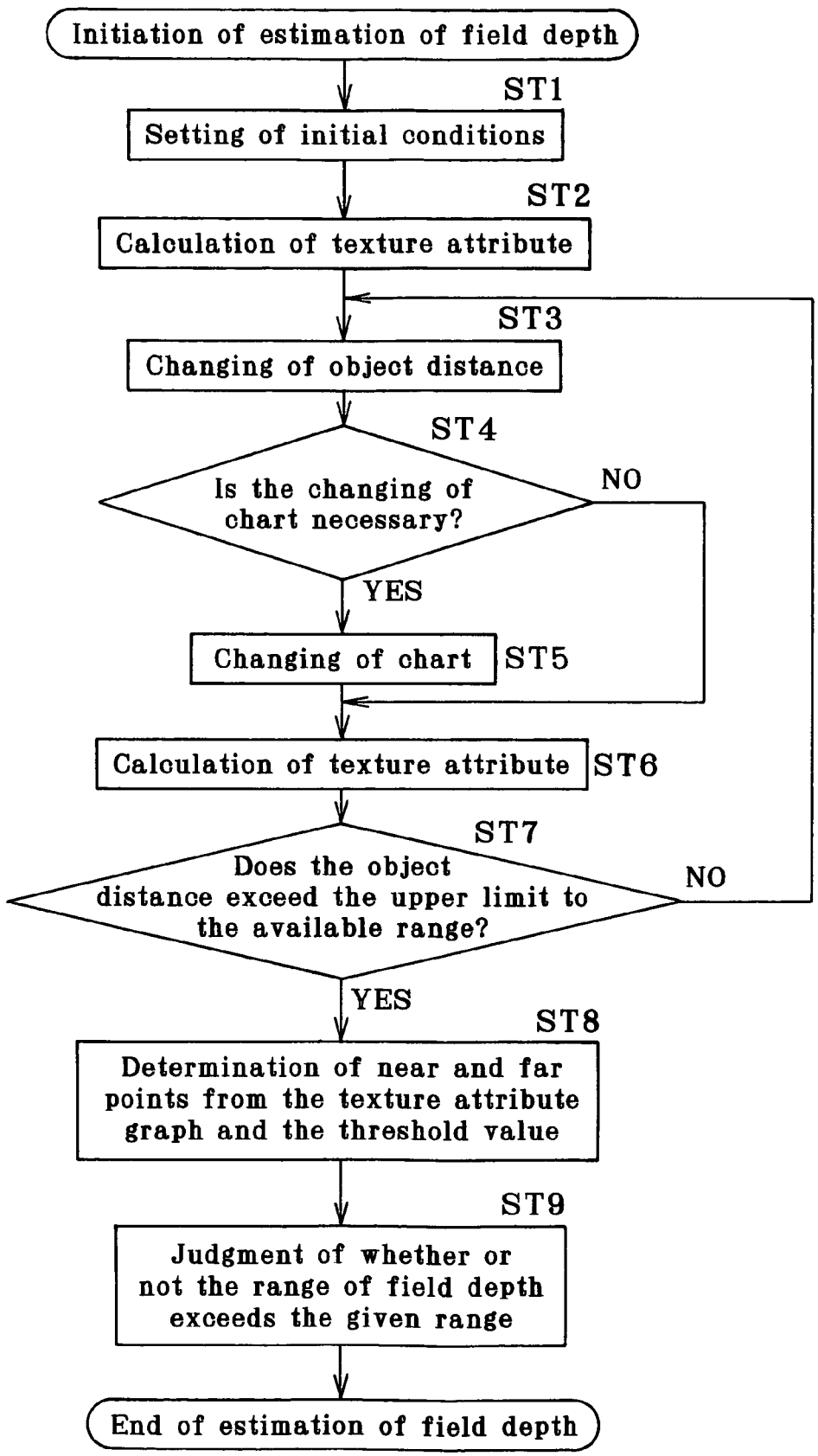
FIG. 10 is a flowchart of one embodiment of making an estimation of the field depth of the image-formation optical system to be inspected according to the invention.

FIG. 10 is a flowchart of how the field depth of an image-formation optical system S to be inspected is estimated, using the imaging capability estimation apparatus of FIG. 7. An image-formation optical system having such lens data as described above is used as the image-formation optical system S. While the image plane of CCD 2 used as an image pickup device is fixed to a given (d-axis) position, the range of an object distance (Z-axis position) where good images are formable on the fixed CCD 2, i.e., the field depth range is determined to estimate the field depth of the image-formation optical system S. When such a field depth is measured, a plurality of interchangeable random patterns 1 (hereinafter called the charts 1 for short) must be provided for the chart mount 7, because the magnification of an image formed on CCD 2 changes with an object distance; that is, the charts 1 must be interchangeably used depending on the object distance in such a way as to satisfy the above condition 2. Further, it is desired that a binarized image be used for texture attribute calculation, again because of the magnification change.

This embodiment is now explained more specifically with reference to FIG. 10. First, at step ST1, initial conditions are set for the imaging capability estimation apparatus of FIG. 7. Specifically, in response to a command from the personal computer 14, the moving table 5 is moved through the drive control circuit 11 to bring the image-formation optical system S to a position nearest to the range where the chart mount 7 is usable. The brightness of illumination light from the surface light source 3 is adjusted through the light source control circuit 13, and the chart 1 well fit for an initial position is mounted on the chart mount 7.

Then, at step ST2, a texture attribute of a random pattern image picked up by CCD 2 is calculated at that initial position. In this embodiment, steps ST1 to ST5 of FIG. 9 should be applied when a binarized image is used as described above. It is here noted that, for instance, the attribute (2) (contrast) in the concurrent incidence matrix set out in Table 1 is used as that texture attribute.

Thereafter, at step ST3, the moving table 5 is moved through the drive control circuit 11 in response to a command from the personal computer 14 to change the object distance away from the image-formation optical system S by such a predetermined minute distance.

Then, at the next step ST4, it is judged whether or not the chart 1 is to be replaced by a new one, because the object distance has been changed with a magnification change. If a new chart is needed, the chart is changed to a new chart 1 at step ST5. Then, at step ST6, the texture attribute is calculated as in step ST2. If, at step ST4, there is no need of the new chart 1, one should skip over step ST5 directly to step ST6 where the texture attribute is calculated.

Then, at step ST7, it is judged whether or not the object distance has exceeded the upper limit to the available range. If it has not, one goes back to step ST3 to repeat steps ST3 to ST7 until the object distance is judged as exceeding the upper limit.

Thereafter, at step ST8, the texture attribute with respect to the object distance is graphed, so that a near point and a far point of the object distance where a good image is formable, i.e., the field depth can be determined from the obtained graph and the threshold value of the texture attribute that has been empirically determined through visual observation.

Then, at step ST9, it is judged whether or not the range of field depth found at step 8 has exceeded the predetermined range for the purpose of finishing the estimation of field depth.

It is here noted that although selection is made from a plurality of random patterns (charts) 1 depending on magnification changes, there is obtained a smooth graph for the texture attribute even when a certain chart 1 is changed to another, provided that they satisfy the conditions for random patterns.

Figure 11:
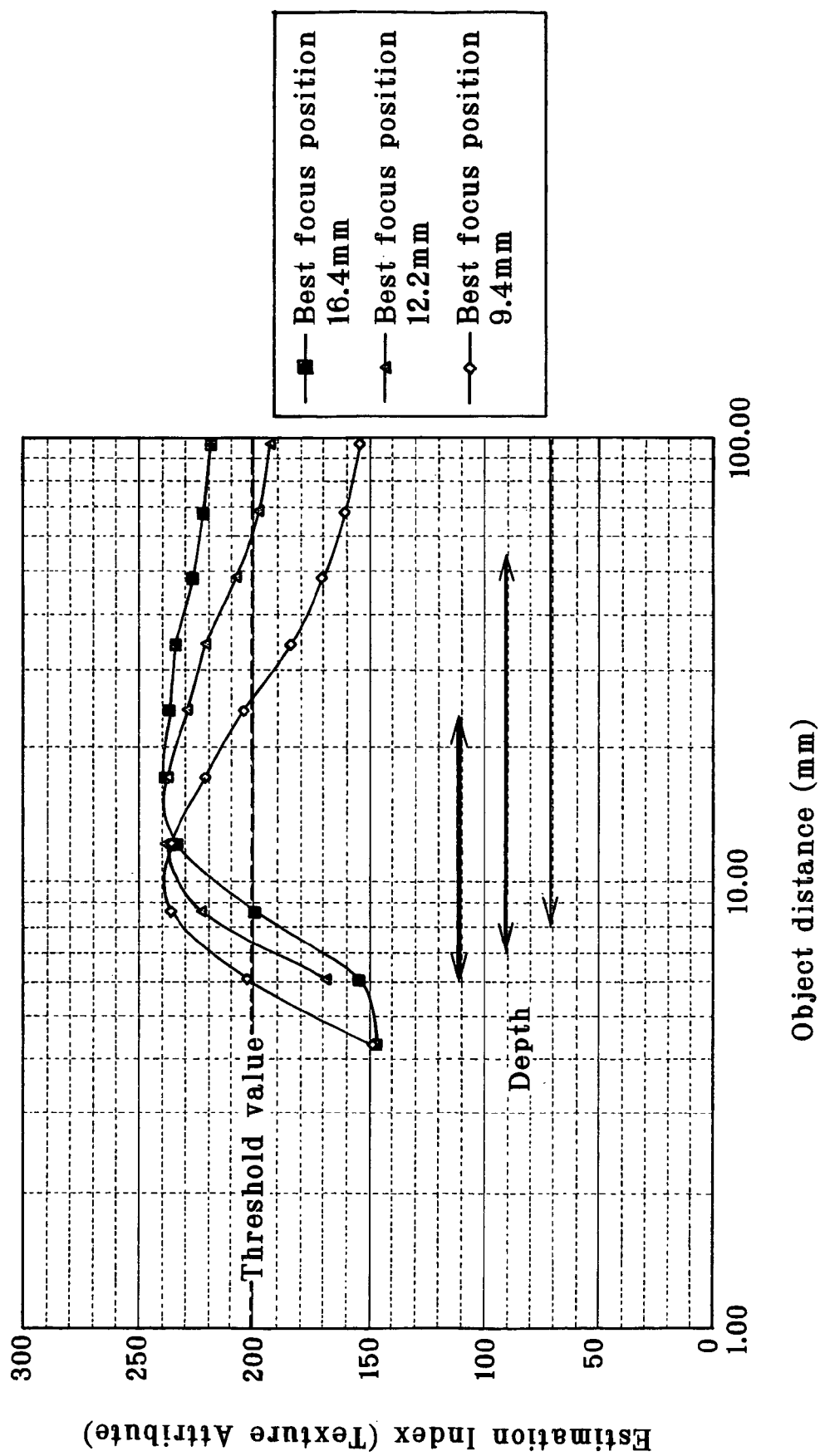
FIG. 11 is illustrative of a texture attribute graph obtained according to the flowchart of FIG. 10, and a field depth range.

FIG. 11 is illustrative of the texture attribute graphs obtained according to the flowchart of FIG. 10 and the range of field depth obtained using an image-formation optical system having such lens data as described above as the image-formation optical system S to be inspected. It is here understood that the attribute (2) (contrast) in the concurrent incidence matrix set out in Table 1, obtained using a binarized image under the condition of d=1, is used as the texture attribute that is an estimation index. The threshold value of 200 has been empirically determined through visual observation. In FIG. 11, the best focus position is an object distance that is conjugate to the position of CCD 2 fixed with respect to the image-formation optical system S to be inspected. From FIG. 11, it is found that the best focus position of 16.4 mm has a field depth of 8.5 mm to 100 mm or greater, the best focus position of 12.2 mm has a field depth of 7 mm to 55 mm, and the best focus position of 9.4 mm has a field depth of 6 mm to 25 mm, all as expressed in an object distance term.

As can be seen from FIG. 11, if the image of the subject random pattern 1 picked up through the image-formation optical system S to be inspected is analyzed for texture, it is then possible to use the results to determine the field depth for each image plane of the image-formation optical system S and, hence, make an estimation of the field depth of the image-formation optical system S.

Figure 12:
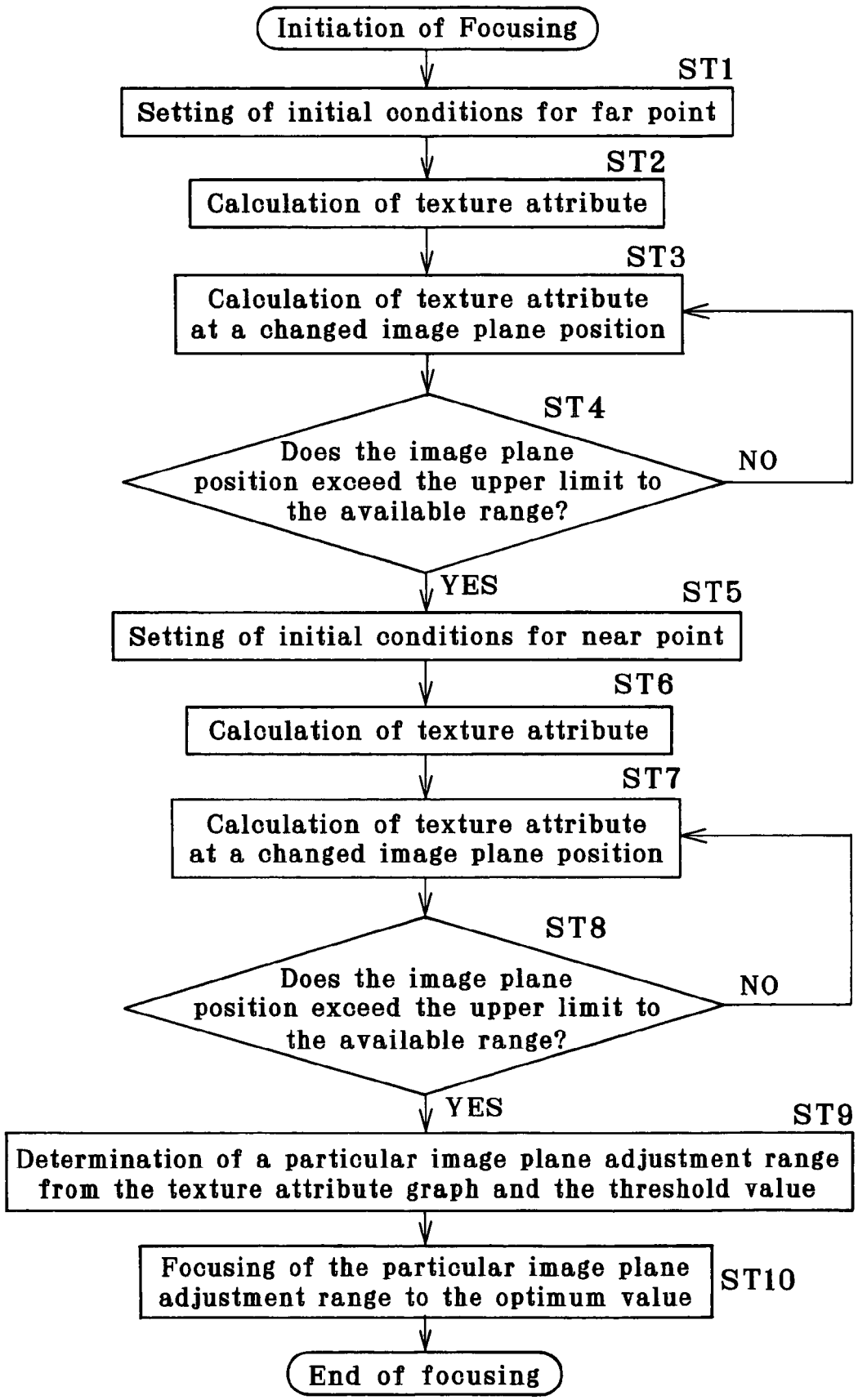
FIG. 12 is a focusing flowchart for finding a fixed image plane position at which given focusing is achieved at either object position of far and near points of the image-formation optical system to be inspected according to the invention.

Reference is now made to FIG. 12 that is a flowchart of focusing. The imaging capability estimation apparatus of FIG. 7 is used with an image-formation optical system having such lens data as described above, which is used as the image-formation optical system S to be inspected. While the position of the chart 1 mounted on the chart mount 7 is fixedly set with respect to the farthest position (far point) and nearest position (near point) presumed for the image-formation optical system S, the image plane position (d-axis position) of CCD 2 that is an image pickup device is changed. From the resultant changes in the texture attribute, the fixed image plane position at which given focusing is achievable at both object positions, i.e., both the far and near points is determined. For such focusing, separate charts 1 best fit for magnification at each of the far and near points are provided for interchangeable use.

This embodiment is now explained specifically with reference to FIG. 12. First, at step ST1, initial conditions are set for the far point of the imaging capability estimation apparatus of FIG. 7. Specifically, in response to a command from the personal computer 14 the moving table 5 is moved through the drive control circuit 11 to move the image-formation optical system S to the farthest position in the available range for the chart mount 7, where it is fixed. On the other hand, the image pickup device holder 6 is moved through the drive control circuit 11 to set the image plane position of CCD 2 mounted thereon with respect to the image-formation optical system S at the lower limit to the available range. Further, the brightness of illumination light from the surface light source 3 is adjusted through the light source control circuit 13, and the chart 1 suitable for an initial position for the far point is located on the chart table 7.

Then, at step ST2, the texture attribute of a random pattern image picked up by CCD 2 at the initial position for the far point is calculated. In this embodiment, steps ST1 to ST9 of FIG. 9 should be applied when binarized images are used, and steps ST1 to ST3 of FIG. 8 should be applied when no binarized image is used. As the texture attribute, for instance, the attribute (2) (contrast) in the concurrent incidence matrix set out in Table 1 is used.

Thereafter, at step ST3, the image pickup device holder 6 is moved through the drive control circuit 11 in response to a command from the personal computer 14, thereby changing (or shifting) the image plane position of CCD 2 away from the image-formation optical system S by a predetermined minute distance.

Then, at the next step ST4, it is judged whether or not the image plane position of CCD 2 has exceeded the upper limit to the available range. If it has not, one goes back to step ST3 to repeat steps ST3 and ST4 until the image plane position is judged as exceeding the upper limit to the available range.

Thereafter, at step ST5, initial conditions are now set for the near point for the imaging capability estimation apparatus of FIG. 7. Specifically, in response to a command from the personal computer 14 the moving table 5 is moved through the drive control circuit 11 to bring the image-formation optical system S to the nearest position in the available range for the chart mount 7, where it is fixed. On the other hand, the image pickup device holder 6 is moved through the drive control circuit 11 to set the image plane position of CCD 2 supported thereon with respect to the image-formation optical system S at the lower limit to the available range. Further, the brightness of illumination light from the surface light source 3 is adjusted through the light source control circuit 13, and the chart 1 suitable for the initial position for the near point is mounted on the chart mount 7.

Then, at step ST6, the texture attribute of a random pattern image picked up by CCD 2 at that near point initial position is calculated as in step ST2.

Thereafter, at step ST7, the image pickup device supporter 6 is moved through the drive control circuit 11 in response to a command from the personal computer 14 to change (or shift) the image plane position of CCD 2 away from the image-formation optical system S by a predetermined minute distance.

Then, at the next step ST8, it is judged whether or not the image plane position of CCD 2 has exceeded the upper limit to the available range. If it has not, one goes back to step ST7 to repeat steps ST7 and ST8 until the image plane position is judged as exceeding the upper limit to the available range.

Thereafter, at step ST9, the texture attribute with respect to the image plane position (the amount of shift) is graphed, and from that graph and the threshold value of the texture attribute that has been empirically determined through visual observation, the range of the image plane having imaging capability for the far point and the range of the image plane having imaging capability for the near point are so found that the particular range of image plane adjustment can be determined from an overlap between both.

Finally, at step ST10, an optimum value empirically determined in the particular range of image plane adjustment determined at step ST9 is learned, so that CCD 2 is focused to that position, finishing focusing.

Figure 13:
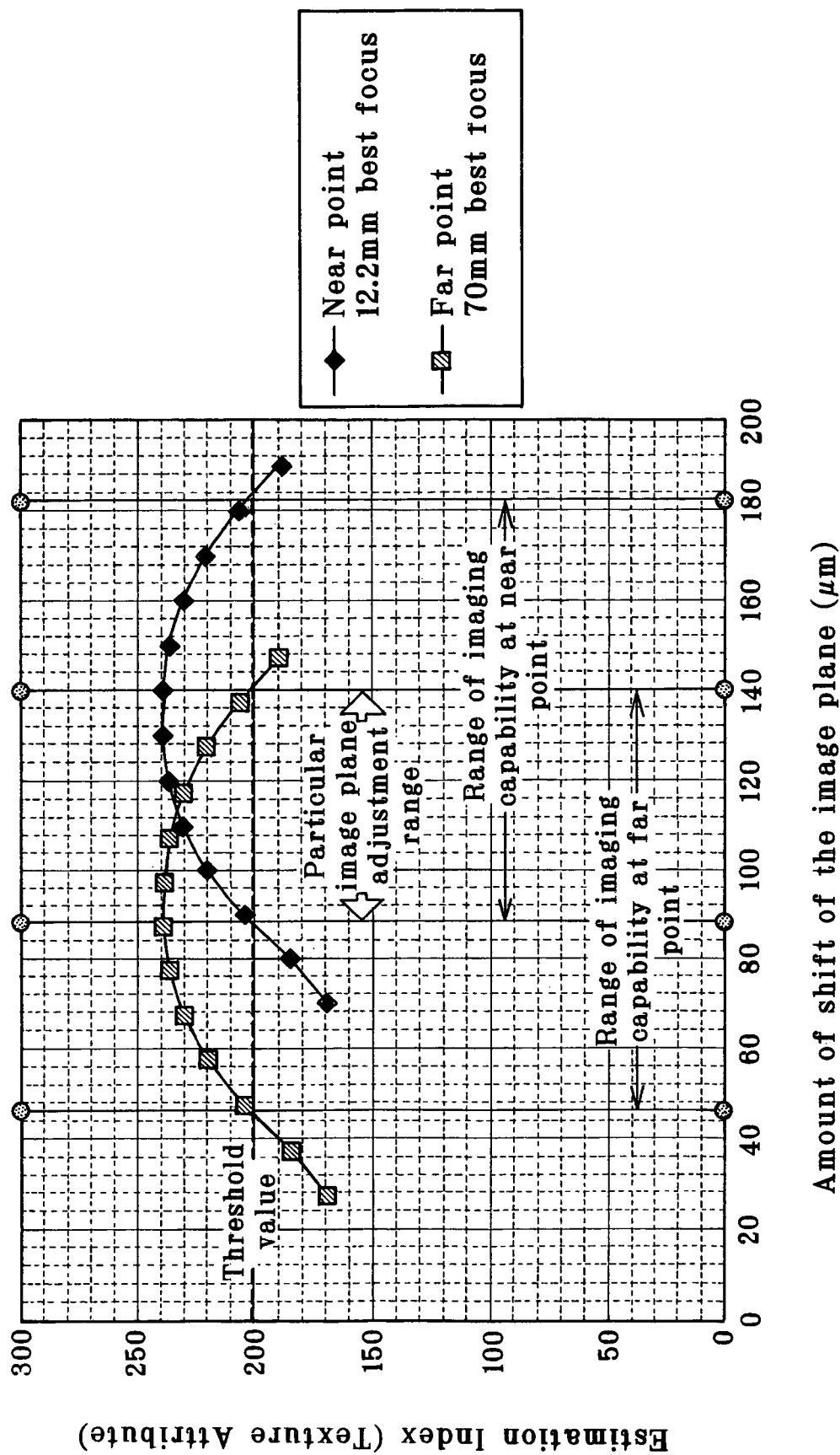
FIG. 13 is illustrative of a texture attribute graph obtained according to the flowchart of FIG. 12, an image plane range with images formable at the far point, an image plane range with images formable at the near point, and a particular image plane adjustment range.

FIG. 13 is illustrative of the texture attribute graph, the image plane range having imaging capability for the far point, the image plane range having imaging capability for the near point and the particular range of image plane adjustment, all determined according to the flowchart of FIG. 12. In FIG. 13, an image-formation optical system having such lens data as described above is used as the image-formation optical system S to be inspected, and the attribute (2) (contrast) in the concurrent incidence matrix set out in Table 1, obtained using a binarized image under the condition of d=1, is used as the texture attribute that is an estimation index. The threshold value of 200 has been empirically determined through visual observation. From FIG. 13, it is seen that given the object distance at the near point is 12.2 mm and the object distance at the far point is 70 mm, the particular range of image plane adjustment comes in the range of 84 μm to 140 μm as expressed in terms of the amount of shift of the image plane (the amount of movement of CCD 2 from the rear end of the lens barrel of the image-formation optical system S), and that CCD 2 is located (or focused) at the optimum value position that is empirically determined in that range.

As can be seen from FIG. 13, if the image of the subject random pattern 1 picked up through the image-formation optical system S to be inspected is analyzed for texture, it is then possible to use the results to locate (focus) the image pickup device CCD 2 at a common image plane position having imaging capability for both the farthest and nearest object positions presumed for the image-formation optical system S.

How to estimate local blurring in the image-formation optical system S to be inspected is now explained with reference to the flowchart of FIG. 14. The imaging capability estimation apparatus of FIG. 7 is used with an image-formation optical system having such lens data as described above, which is applied as that image-formation optical system S. Specifically, whether or not (local) blurring takes place is estimated by way of a comparison of texture attributes when the chart 1 mounted on the chart mount 7 is positioned at a peripheral area of the object plane of the image-formation optical system S, although it remains focused at the center area of that object plane. For such local blurring estimations, one common chart 1 would suffice for the estimation of the central and peripheral areas of the image-formation optical system S when there is a small magnification difference between both the central area and the peripheral area (or when distortion is small). In an image-formation optical system having such lens data as described above, however, separate charts 1 proper for magnifications at the central and peripheral areas must be interchangeably used because it is used as an inner objective lens with increased distortion.

The instant embodiment is now explained with reference to FIG. 14. First, at step ST1, the initial conditions for the imaging capability estimation apparatus of FIG. 7 are set. Specifically, a central area chart 1 is mounted on the chart mount 7, and the position of the chart mount 7 is adjusted through the drive control circuit 11 in the X- and Y-axis directions to position the chart 1 at a central area of the object plane of the image-formation optical system S to be inspected. The moving table 5 is moved through the drive control circuit 11 to fix the image-formation optical system S at a given object distance with respect to the chart mount 7. The brightness of illumination light from the surface light source 3 is adjusted through the light source control circuit 13.

Then, at step ST2, the texture attribute of a random pattern image picked up by CCD 2 i at the central area of the image plane 20 (FIG. 15) of the image-formation optical system S is calculated. Steps ST1 to ST5 of FIG. 9 should be applied when a binarized image is used, while steps ST1 to ST3 of FIG. 8 should be applied when no binarized image is used.

Thereafter, at step ST3, the position of the chart mount 7 is adjusted through the drive control circuit 11 in the X- and Y-axis directions in response to a command from the personal computer 14 to move the chart mount 7 to any one of four peripheral areas of the object plane of the image-formation optical system.

Then, at step ST4, it is judged whether or not there is need of changing the chart 1 to be mounted on the chart mount 7 to another chart. When changing from the central area to a particular peripheral area, replacement of the chart 1 is required. Thus, at the next step ST5, the chart is changed to a particular peripheral area chart 1, after which, at step ST6, the texture attribute at that peripheral area is calculated as in step ST2. If, at step ST4, there is no need of replacement of the chart 1, the texture attribute is calculated directly at step ST6.

Thereafter, at step ST7, it is judged whether or not the calculation of the texture attributes at four peripheral areas has been over. If it has not, one goes back to step ST3 to repeat steps ST3 to ST6 until the calculation of all the texture attributes at four peripheral areas is over.

Thereafter, at step ST8, the texture attributes at the central and four peripheral areas of the image plane 20 of the image-formation optical system S are compared to make a pass/fail judgment of the image-formation optical system S, thereby finishing the estimation of local blurring.

As an example, the criteria for the estimation of local blurring at the above step ST8 are explained.

For this estimation, the following three criteria are needed.

(1) Regarding whether or not there is sufficient imaging capability at the peripheral areas, estimation is made of the limit of the amount of blurring at the peripheral areas.

(2) Regarding whether or not the amount of local blurring is in an allowable range, a site-depending difference in the amount of blurring among the peripheral areas is estimated.

(3) Regarding whether or not the whole screen is well-balanced, a difference in the average amount of blurring between the central and the peripheral areas is estimated.

The foregoing may be represented by the following formulae:

$$UR > la,\ UL > la, DR > la,\ DL > la \quad (1)$$

$$|\max(UR,\ UL,\ DR,\ DL) - \min(UR,\ UL,\ DR,\ DL)| < ua \quad (2)$$

$$|C - (UR + UL + DR + DL)/4| < ub \quad (3)$$

where C is the value of estimation found at the central area,
UR, UL, DR and DL are the values of estimation found at the peripheral areas,
la is the lower-limit threshold value to the amount of blurring at the peripheral areas,
ua is the upper-limit threshold value to a difference in the amount of blurring at the peripheral areas,
ub is the upper-limit threshold value to a difference in the amount of blurring between the central and the peripheral areas, and
max and min are the maximum and minimum, respectively, of the values of estimation found at the peripheral areas. C, UR, UL, DR and DL are located on the image plane 20 of the image-formation optical system S to be inspected, as shown in FIG. 15.

The image-formation optical system S to be inspected, if it clears the above formulae (1), (2) and (3), is judged as acceptable.

Figure 14:
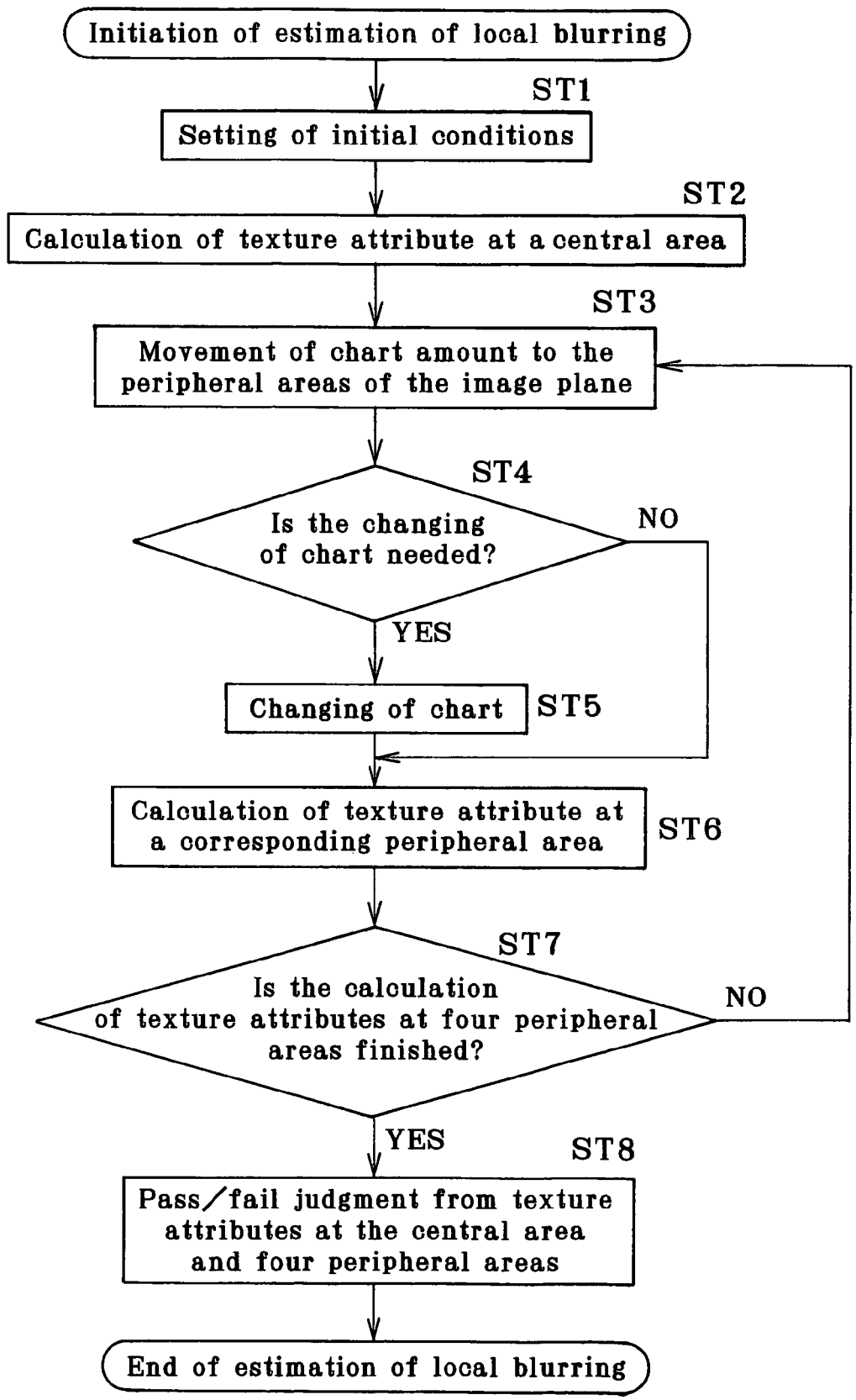
FIG. 14 is a flowchart for the estimation of local blurring in the image-formation optical system to be inspected according to the invention.
Figure 15:
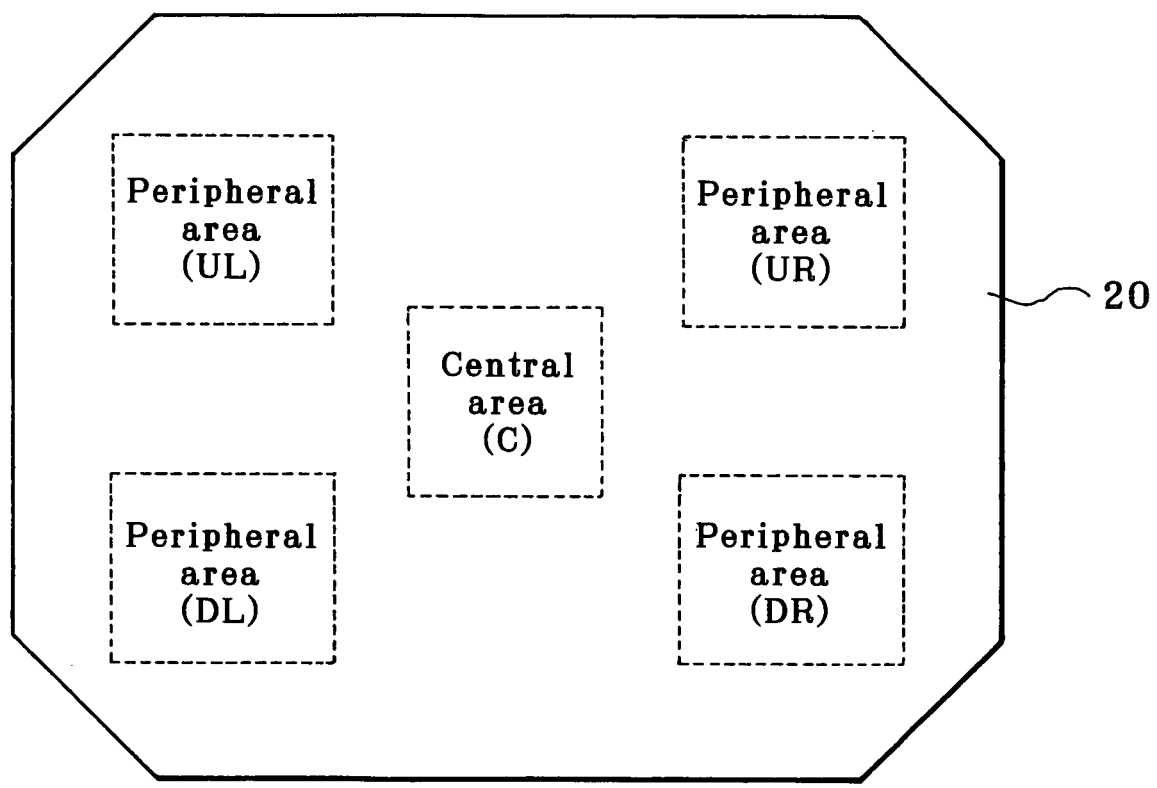
FIG. 15 is illustrative of areas for finding texture attributes on the image plane of the image-formation optical system to be inspected according to FIG. 14.
Figure 16A:
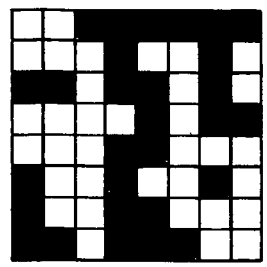
FIG. 16 is illustrative of a conventional MTF measurement method using a random pattern.
Figure 16B:
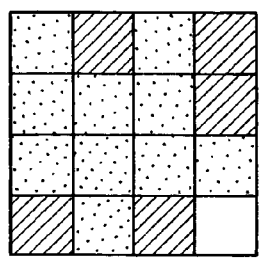
Figure 16:
Figure 16:
Figure 16:
Figure 16:

As can be appreciated from the explanation given with reference to FIGS. 14 and 15, the local blurring in the image-formation optical system S to be inspected can be quickly estimated from the results of texture analysis of an image of random pattern 1 picked up through the image-formation optical system S.

What we claim is:

1. An imaging capability estimation method for an image-formation optical system, which method uses a random pattern which is a binary pattern comprising white and black dots lined up at random in row and column directions, and when 1 is allocated to a white dot and 0 is allocated to a black dot and all rows or columns are sequentially linked together into a series of sequence of numbers, 1 and 0 are lined up along said sequence of numbers at random and out of order, and which is characterized in that a distribution of mean values of randomly extracted samples converge into a normal distribution according to the central limit theorem, wherein:

the random pattern satisfies one of the following conditions:

$I \leq 4 \times p/|\beta|$, or $I \leq 4 \times P/|\beta|$, where I is a lattice size of the random pattern, $|\beta|$ is a magnification of the image-formation optical system, p is a sampling interval corresponding to a pixel pitch of an image pickup device, and P is a value, calculated as size on an image plane, of one of: (a) a pixel pitch or a minimum information unit on estimation image signals, and (b) a pixel pitch or minimum display unit on estimation display image, an image of said random pattern is picked up through said image-formation optical system, a texture statistic is calculated from the thus picked up random pattern image, and said image-formation optical system is estimated for imaging capability, using the obtained texture statistic.

2. An imaging capability estimation method for an image-formation optical system, which method uses a random pattern which is a binary pattern comprising white and black dots lined up at random in row and column directions, in which when 1 is allocated to a white dot and 0 is allocated to a black dot and all rows or columns are sequentially linked together into a series of sequence of numbers, 1 and 0 are lined up along said sequence of numbers at random and out of order, and which is characterized in that a distribution of mean values of randomly extracted samples converge into a normal distribution according to the central limit theorem, wherein the random pattern satisfies one of the following conditions:

$I \leq 4 \times p/|\beta|$, or $I \leq 4 \times P/|\beta|$, where I is a lattice size of the random pattern, $|\beta|$ is a magnification of the image-formation optical system, p is a sampling interval corresponding to a pixel pitch of an image pickup device, and P is a value, calculated as size on an image plane, of one of: (a) a pixel pitch or a minimum information unit on estimation image signals, and (b) a pixel pitch or minimum display unit on estimation display image, the method comprising the steps of:

picking up an image of said random pattern through said image-formation optical system, calculating a texture statistic from the picked-up random pattern image, and adjusting a position, and making a pass/fail judgment, of said image-formation optical system, using the calculated texture statistic.

3. The imaging capability estimation method for an image-formation optical system according to claim 1 or 2, which further comprises a step of forming the picked-up random pattern image into a gray-scale image prior to calculation of the texture statistic.

4. The imaging capability estimation method for an image-formation optical system according to claim 1 or 2, which further comprises a step of binarizing the picked-up random pattern image prior to calculation of the texture statistic.

5. The imaging capability estimation method for an image-formation optical system according to claim 1 or 2, wherein said texture statistic is a texture statistic using a concurrent incidence matrix.

6. The imaging capability estimation method for an image-formation optical system according to claim 1 or 2, wherein said texture statistic is a texture statistic using a differential statistic.

7. The imaging capability estimation method for an image-formation optical system according to claim 1 or 2, wherein:

while changing a position of a random pattern located with respect to said image-formation optical system or a position of the image pickup device located with respect to said image-formation optical system, the random pattern image is sequentially picked up, the texture statistic is calculated from the picked-up random pattern image, and how the obtained texture statistic changes with respect to the position of the random pattern located or the position of the image pickup device located is found to determine a range of the position of the random pattern located or the image pickup device located, in which the texture statistic exceeds a preset threshold value.

8. The imaging capability estimation method for an image-formation optical system according to claim 7, wherein image capabilities of said image-formation optical system at both a central area and a peripheral area of an image plane thereof are determined for estimation of local blurring.

9. The imaging capability estimation method for an image-formation optical system according to claim 1 or 2, wherein a random pattern is changed with a change in the position of the random pattern located with respect to the image-formation optical system.

10. The imaging capability estimation method for an image-formation optical system according to claim 9, wherein a field depth of said image-formation optical system with respect to a particular image plane position is determined.

11. The imaging capability estimation method for an image-formation optical system according to claim 9, wherein a common image plane position range, in which an image is formable with respect to both a far point and a near point of an object position of said image-formation optical system, is determined.

12. The method as recited in claim 1, wherein the random pattern satisfies the following conditions (A), (B) and (C) which define an acceptable approximation of the normal distribution:

(A) average $\mu \leq 0.5 \pm 0.3$;
(B) kurtosis $|K| \leq 1.2$; and
(C) skewness $|S| \leq 0.9$.

13. The method as recited in claim 2, wherein the random pattern satisfies the following conditions (A), (B) and (C) which define an acceptable approximation of the normal distribution:

(A) average $\mu \leqq 0.5 \pm 0.3$;
(B) kurtosis $|K| \leqq 1.2$; and
(C) skewness $|S| \leqq 0.9$.

14. An imaging capability estimation apparatus for an image-formation optical system, comprising:
 a chart mount for supporting a random pattern which is a binary pattern comprising white and black dots lined up at random in row and column directions, in which when 1 is allocated to a white dot and 0 is allocated to a black dot and all rows or columns are sequentially linked together into a series of sequence of numbers, 1 and 0 are lined up along said sequence of numbers at random and out of order, and which is characterized in that a distribution of mean values of randomly extracted samples converge into a normal distribution according to the central limit theorem,
 wherein the random pattern satisfies one of the following conditions:

$$I \leqq 4 \times p/|\beta|, \text{ and}$$

$$I \leqq 4 \times P/|\beta|,$$

where I is a lattice size of the random pattern, $|\beta|$ is a magnification of the image-formation optical system, p is a sampling interval corresponding to a pixel pitch of an image pickup device, and P is a value, calculated as size on an image plane, of one of: (a) a pixel pitch or a minimum information unit on estimation image signals, and (b) a pixel pitch or minimum display unit on estimation display image,
 an image-formation optical system supporter for supporting said image- formation optical system, which is located for relative movement in an orthogonal direction with respect to said chart mount,
 an image pickup device supporter for supporting the image pickup device on an image plane side of said image-formation optical system supported on said image-formation optical system supporter for adjustment in an optical axis direction thereof, and
 a texture statistic calculation means for calculation of a texture statistic from an image of said random pattern picked up by said image pickup device.

15. The imaging capability estimation apparatus for an image-formation optical system according to claim 14, wherein said chart mount is designed in such a way as to interchangeably support thereon a plurality of random patterns.

16. The imaging capability estimation apparatus for an image-formation optical system according to claim 14, wherein said chart mount is designed in such a way as to be adjustable for position in two directions orthogonal with respect to an optical axis of said image-formation optical system.

17. The imaging capability estimation apparatus for an image-formation optical system according to claim 14, which further comprises means for forming the image of the random pattern picked up by said image pickup device into a gray-scale image.

18. The imaging capability estimation apparatus for an image-formation optical system according to claim 14, which further comprises means for binarizing the image of the random pattern picked up by said image pickup device into a gray-scale image.

19. The apparatus as recited in claim 14, wherein the random pattern satisfies the following conditions (A), (B) and (C) which define an acceptable approximation of the normal distribution:
 (A) average $\mu \leqq 0.5 \pm 0.3$;
 (B) kurtosis $|K| \leqq 1.2$; and
 (C) skewness $|S| \leqq 0.9$.

20. A focusing apparatus for an image-formation optical system, comprising:
 a chart mount for supporting a random pattern which is a binary pattern comprising white and black dots lined up at random in row and column directions, in which when 1 is allocated to a white dot and 0 is allocated to a black dot and all rows or columns are sequentially linked together into a series of sequence of numbers, 1 and 0 are lined up along said sequence of numbers at random and out of order, and which is characterized in that a distribution of mean values of randomly extracted samples converge into a normal distribution according to the central limit theorem,
 wherein the random pattern satisfies one of the following conditions:

$$I \leqq 4 \times p/|\beta|, \text{ and}$$

$$I \leqq 4 \times P/|\beta|,$$

where I is a lattice size of the random pattern, $|\beta|$ is a magnification of the image-formation optical system, p is a sampling interval corresponding to a pixel pitch of an image pickup device, and P is a value, calculated as size on an image plane, of one of: (a) a pixel pitch or a minimum information unit on estimation image signals, and (b) a pixel pitch or minimum display unit on estimation display image,
 an image-formation optical system supporter for supporting said image-formation optical system, which is located for relative movement in an orthogonal direction with respect to said chart mount,
 an image pickup device supporter for supporting the image pickup device on an image plane side of said image-formation optical system supported on said image-formation optical system supporter for adjustment in an optical axis direction thereof, and
 a texture statistic calculation means for calculation of a texture statistic from an image of said random pattern picked up by said image pickup device.

21. The apparatus as recited in claim 20, wherein the random pattern satisfies the following conditions (A), (B) and (C) which define an acceptable approximation of the normal distribution:
 (A) average $\mu \leqq 0.5 \pm 0.3$;
 (B) kurtosis $|K| \leqq 1.2$; and
 (C) skewness $|S| \leqq 0.9$.

* * * * *